United States Patent
Saar et al.

(10) Patent No.: US 8,316,955 B2
(45) Date of Patent: Nov. 27, 2012

(54) CARBON DIOXIDE-BASED GEOTHERMAL ENERGY GENERATION SYSTEMS AND METHODS RELATED THERETO

(75) Inventors: Martin O. Saar, St. Paul, MN (US); Jimmy Bryan Randolph, Minneapolis, MN (US); Thomas H. Kuehn, Mahtomedi, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 0 days.

(21) Appl. No.: 13/202,746

(22) PCT Filed: Mar. 12, 2010

(86) PCT No.: PCT/US2010/000756
§ 371 (c)(1),
(2), (4) Date: Sep. 16, 2011

(87) PCT Pub. No.: WO2010/104599
PCT Pub. Date: Sep. 16, 2010

(65) Prior Publication Data
US 2012/0001429 A1    Jan. 5, 2012

Related U.S. Application Data

(60) Provisional application No. 61/159,948, filed on Mar. 13, 2009.

(51) Int. Cl.
*E21B 43/24* (2006.01)
*F03G 7/00* (2006.01)
(52) U.S. Cl. ............... 166/402; 166/272.1; 166/302; 48/61; 48/197 R; 60/641.2
(58) Field of Classification Search ............ 166/302, 166/268, 402, 267, 305.1, 272.1, 303; 48/61; 48/197 R; 60/641.2–641.5
See application file for complete search history.

(56) References Cited

U.S. PATENT DOCUMENTS 3,786,858 A * 1/1974 Potter et al. ............ 165/45
(Continued)

FOREIGN PATENT DOCUMENTS

FR    2881482 A1    8/2006
(Continued)

OTHER PUBLICATIONS

"Amplatzer(r)—Multifenstrated Septal Occluder—"Cribriform"", (c) 207-2010 AGA Medical Corporation, 10 pgs.
(Continued)

*Primary Examiner* — Jennifer H Gay
(74) *Attorney, Agent, or Firm* — Schwegman, Lundberg & Woessner, P.A.

(57) ABSTRACT

A geothermal energy generation system comprises one or more injection wells for accessing one or more reservoirs having a first temperature, wherein the reservoirs are located below one or more caprocks and are accessible without using large-scale hydrofracturing. Each of the injection wells has an injection well reservoir opening, and one or more production wells each having a production well reservoir opening. A non-water based working fluid can be provided to the injection wells at a second temperature lower than the first temperature. Exposure of the working fluid to the first temperature can produce heated working fluid capable of entering one or more production wells. An energy converting apparatus is connected to each of the one or more injection wells and the one or more productions wells and thermal energy contained in the heated working fluid can be converted to electricity, heat, or combinations thereof, in the energy converting apparatus.

20 Claims, 14 Drawing Sheets

U.S. PATENT DOCUMENTS

| | | | |
|---|---|---|---|
| 4,060,988 A | 12/1977 | Arnold | |
| 4,132,269 A * | 1/1979 | Chasteen | 166/268 |
| 4,200,152 A * | 4/1980 | Foster et al. | 166/271 |
| 4,223,729 A * | 9/1980 | Foster | 166/271 |
| 4,357,802 A * | 11/1982 | Wahl et al. | 60/641.5 |
| 4,765,143 A * | 8/1988 | Crawford et al. | 60/671 |
| 5,038,567 A | 8/1991 | Mortiz | |
| 6,668,554 B1 * | 12/2003 | Brown | 60/641.2 |
| 7,320,221 B2 * | 1/2008 | Bronicki | 60/641.2 |
| 7,562,708 B2 * | 7/2009 | Cogliandro et al. | 166/248 |
| 7,624,801 B2 * | 12/2009 | Zubrin et al. | 166/250.15 |
| 7,650,939 B2 * | 1/2010 | Zubrin et al. | 166/266 |
| 7,654,320 B2 * | 2/2010 | Payton | 166/257 |
| 7,654,330 B2 * | 2/2010 | Zubrin et al. | 166/369 |
| 7,753,122 B2 * | 7/2010 | Curlett | 166/302 |
| 7,753,972 B2 * | 7/2010 | Zubrin et al. | 48/61 |
| 7,810,565 B2 * | 10/2010 | Zubrin et al. | 166/266 |
| 7,866,385 B2 * | 1/2011 | Lambirth | 166/256 |
| 7,937,948 B2 * | 5/2011 | Zubrin et al. | 60/780 |
| 7,946,346 B2 * | 5/2011 | Zornes | 166/309 |
| 7,975,482 B2 * | 7/2011 | Foppe | 60/641.2 |
| 8,047,007 B2 * | 11/2011 | Zubrin et al. | 60/780 |
| 2002/0195246 A1 * | 12/2002 | Davidson | 166/249 |
| 2004/0200618 A1 * | 10/2004 | Piekenbrock | 166/305.1 |
| 2005/0189108 A1 * | 9/2005 | Davidson | 166/249 |
| 2007/0193744 A1 * | 8/2007 | Bridges | 166/272.1 |
| 2007/0223999 A1 | 9/2007 | Curlett | |
| 2007/0261844 A1 * | 11/2007 | Cogliandro et al. | 166/248 |
| 2008/0283247 A1 * | 11/2008 | Zubrin et al. | 166/305.1 |
| 2008/0283249 A1 * | 11/2008 | Zubrin et al. | 166/369 |
| 2008/0296018 A1 * | 12/2008 | Zubrin et al. | 166/267 |
| 2009/0008089 A1 * | 1/2009 | Zubrin et al. | 166/250.15 |
| 2009/0014170 A1 * | 1/2009 | Zubrin et al. | 166/90.1 |
| 2009/0236093 A1 * | 9/2009 | Zubrin et al. | 166/268 |
| 2010/0038082 A1 * | 2/2010 | Zubrin et al. | 166/268 |
| 2010/0163226 A1 * | 7/2010 | Zornes | 166/268 |
| 2010/0206565 A1 * | 8/2010 | Embry et al. | 166/272.3 |
| 2010/0224369 A1 * | 9/2010 | Calderon et al. | 166/303 |
| 2010/0272515 A1 * | 10/2010 | Curlett | 405/55 |
| 2010/0314136 A1 * | 12/2010 | Zubrin et al. | 166/402 |
| 2011/0067410 A1 * | 3/2011 | Zubrin et al. | 60/780 |
| 2011/0173139 A1 * | 7/2011 | Zauderer | 705/500 |
| 2011/0203292 A1 * | 8/2011 | Zubrin et al. | 60/780 |
| 2011/0272166 A1 * | 11/2011 | Hunt | 166/402 |
| 2011/0290483 A1 * | 12/2011 | Zornes | 166/271 |
| 2012/0001429 A1 * | 1/2012 | Saar et al. | 290/52 |

FOREIGN PATENT DOCUMENTS

| | | |
|---|---|---|
| WO | WO-2010104599 A2 | 9/2010 |
| WO | WO-2010104599 A3 | 1/2011 |

OTHER PUBLICATIONS

"Binary cycle geothermal plant", The Encyclopedia of Alternative Energy and Sustainable Living, [online] {archived Apr. 13, 2008}. Retrieved from the Internet: <URL:http://web.archive.org/web/20080413112401/http://www.daviddarling.info/encyclopedia/B/AE_binary_cycle_geothermal_plant.html>, (2008), 2 pgs.

"International Application Serial No. PCT/US2010/000756, Search Report mailed Nov. 17, 2010", 5.

"International Application Serial No. PCT/US2010/000756, Written Opinion mailed Nov. 17, 2010", 3.

Atrens, A. D, et al., "CO2 Thermosiphon for Competitive Geothermal Power Generation", Energy & Fuels, 23, (2009), 553-557.

Mathias, J. A., et al., "Experimental Testing of Gerotor and Scroll Expanders Used in, and Energetic and Exergetic Modeling of, an Organic Rankine Cycle", Journal of Energy Resources Technology, 131, (Mar. 2009), 012201-1-012201-9.

Quoilin, S., et al., "Experimental study and modeling of an Organic Rankine Cycle using scroll expander", Applied Energy, 87, (2010), 1260-1268.

Smith, T. C. B., "Low Cost Organic Rankine Cycles for Grid Connected Power Generation", Proceedings of ISES Solar World Congress, (Jun. 2003), 8 pgs.

\* cited by examiner

US 8,316,955 B2

CARBON DIOXIDE-BASED GEOTHERMAL ENERGY GENERATION SYSTEMS AND METHODS RELATED THERETO

CROSS REFERENCE TO RELATED APPLICATIONS

This application is a National Stage Application under 35 U.S.C. §371 of PCT/US2010/000756, filed Mar. 12, 2010 and published as WO 2010/104599 on Sep. 16, 2010, which application claims the benefit under 35 U.S.C. 119 (e) of U.S. Provisional Application Ser. No. 61/159,948 filed on Mar. 13, 2009, both of which are hereby incorporated by reference in their entireties.

BACKGROUND

In light of global climate change and in response to an increased desire to reduce dependence on foreign oil supplies, renewable energy systems, such as wind, solar and geothermal-based systems are being increasingly researched and developed. However, many such systems have only limited potential due to, for example, high costs, overall process inefficiencies, possible adverse environmental impact, and the like.

What is needed, therefore, are cost effective renewable energy systems which are not only efficient, but can improve the environment.

SUMMARY

The inventors recognize the need for providing a cost effective carbon dioxide based geothermal energy system which, in some embodiments, provides added benefits for the environment by sequestering and containing excess carbon dioxide. In one embodiment, a system comprising one or more injection wells for accessing one or more reservoirs having a first temperature, wherein the one or more reservoirs are located below one or more caprocks and are accessible without using large-scale hydrofracturing, each of the one or more injection wells having an injection well reservoir opening; one or more production wells, each having a production well reservoir opening, wherein a non-water based working fluid can be provided to the one or more injection wells at a second temperature lower than the first temperature and exposure of the non-water based working fluid to the first temperature can produce heated non-water based working fluid capable of entering each of the one or more production well reservoir openings; and an energy converting apparatus connected to each of the one or more injection wells and the one or more productions wells, wherein thermal energy contained in the heated non-water based working fluid can be converted to electricity, heat, or combinations thereof, in the energy converting apparatus is provided.

In various embodiments, each of the one or more injection wells and each of the one or more production wells are located in the same channel and the system further comprises one or more injection pipes and one or more production pipes connected to the channel.

In various embodiments, the system further comprises a non-water based working fluid source, such as carbon dioxide (e.g., supercritical carbon dioxide) obtainable from a power plant (e.g., ethanol plant or fossil-fuel based power plant) or an industrial plant. In one embodiment, the energy converting apparatus comprises one or more expansion devices and one or more generators, one or more heat exchangers or a combination thereof. In one embodiment, the one or more generators can provide electricity to an electricity provider and the system further comprises the electricity provider. Additionally, in one embodiment, each of the one or more heat exchangers can provide heat to a heat provider and the system further comprises the heat provider, such as a direct use provider or a ground heat pump.

In one embodiment, the system further comprises one or more cooling units fluidly connected to the one or more production wells and the one or more injection wells.

In one embodiment, a method comprising accessing one or more underground reservoirs having a natural temperature, the one or more reservoirs located beneath one or more caprocks; introducing a non-water based working fluid (e.g., carbon dioxide, such as supercritical carbon dioxide) into the one or more reservoirs; exposing the non-water based fluid to the natural temperature to produce heated fluid; and extracting thermal energy from the fluid, without using large-scale hydrofracturing, is provided.

In various embodiments, the heated fluid also contains native fluid present in the one or more reservoirs. In one embodiment, the one or more caprocks each have a permeability ranging from about $10^{-16}$ m$^2$ to about 0 m$^2$ and the one or more reservoirs each have a porosity ranging from about one (1) % to about 50% and a permeability ranging from about $10^{-16}$ m$^2$ to about $10^{-6}$ m$^2$, with each of the one or more reservoirs having a natural temperature between about −30° C. and about 300° C.

In one embodiment, the thermal energy is used to produce electricity, to heat a working fluid in one or more heat exchangers, to provide condensed fluid to the one or more reservoirs, to provide cooled fluid to the one or more reservoirs, to provide shaft power to one or more pumps or compressors, or a combination thereof. In various embodiments, the electricity is produced either by providing the hot fluid to one or more expansion devices or by providing the working fluid heated in the one or more heat exchangers to the one or more expansion devices, wherein the one or more expansion devices produces shaft power to one or more generators, which, in turn, produce the electricity.

In one embodiment, the working fluid heated in the one or more heat exchangers provides heat for direct use, for groundwater heat pumps, for a Rankine power cycle, or a combination thereof. In various embodiments, the method further comprises choosing the underground reservoir; transporting a non-water based working fluid source to an area proximate to the injection well; converting the non-water based working fluid source into a non-water based working fluid; and providing the heat energy to a customer.

The geothermal energy obtained using the novel systems and methods described herein can be used for a variety of applications, including, but not limited to, electricity generation and/or direct uses (e.g., aquaculture, greenhouse, industrial and agricultural processes, resorts, space and district heating (wells to structures) and/or ground-source heat pumps. Furthermore, cascading systems can be used to draw off energy at decreasing temperatures, thus allowing a single geothermal resource to be used for multiple purposes.

The ability to also geologically sequester carbon dioxide from various sources and use it to generate energy and, optionally, store excess carbon dioxide, means that the novel systems and methods described herein can also serve as a means to mitigate global warming. Additionally, the novel embodiments described herein can increase carbon-sequestration-based revenue potential from carbon offset sales in carbon cap and trade and similar markets.

DETAILED DESCRIPTION

Figure 1:
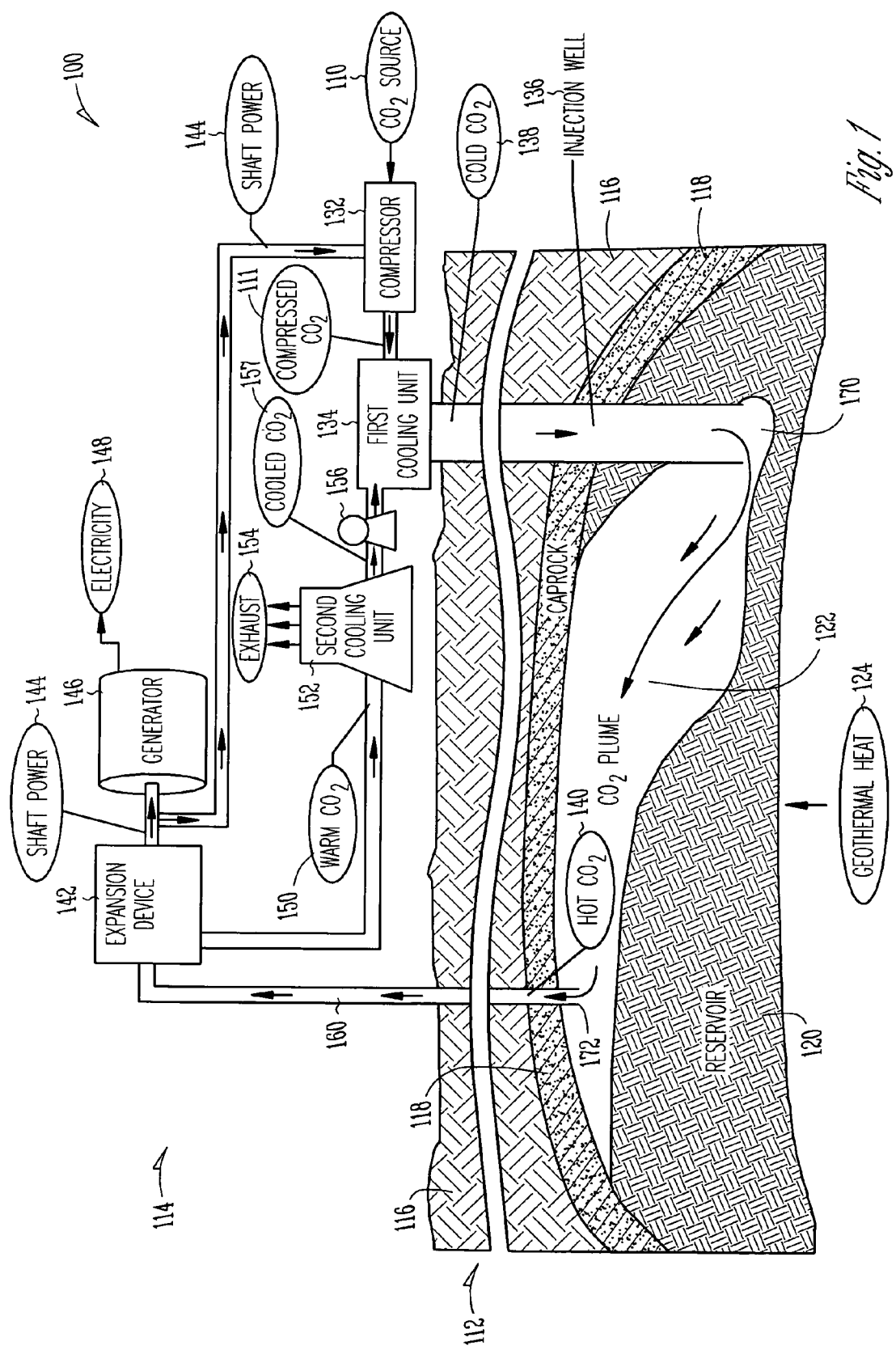
FIG. 1 is a simplified schematic diagram of an energy generation system according to an embodiment of the invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural, chemical and system changes may be made without departing from the spirit and scope of the present invention. The following detailed description is, therefore, not to be taken in a limiting sense, and the scope of the present invention is defined by the appended claims and their equivalents.

The detailed description begins with a definition section followed by a brief overview of conventional geothermal energy technology, a description of the embodiments, an example section and a brief conclusion.

In one embodiment, novel carbon dioxide-based geothermal energy generation systems, i.e., carbon plume geothermal (CPG) systems, and methods are provided. With the novel systems and methods described herein, geothermal energy can now be provided at lower reservoir temperatures and at locations other than hot, dry rock formations, without negatively impacting the surrounding area through use of large-scale hydrofracturing. Use of a carbon dioxide-based geothermal system further provides a means for sequestering and storing excess carbon dioxide, rather than having it released to the atmosphere.

Conventional Geothermal Energy Technology

Geothermal energy is heat energy stored within the earth (or any other planet), which can be "mined" for various uses, including to produce electricity, for direct use, or for ground-source heat pumps. Geothermal energy sources are relatively constant with heat energy replenished on human time scales after being "mined," and further require no storage other than the earth.

Potential uses of conventional geothermal energy are generally temperature dependent, with cascading systems utilizing a single geothermal resource for multiple purposes. Current water-based geothermal systems (i.e., conventional water-based enhanced geothermal systems (EGS) and conventional non-EGS water-based), which use water as a working fluid, require very high temperatures. For example, electricity generation at water-based geothermal power plants typically requires temperatures which can exceed 150° C. Direct uses, such as aquaculture, greenhouse, industrial and agricultural processes, resorts, space and district heating (wells to structures) from such systems utilize more moderate temperatures of about 38 to 150° C. when water is the subsurface geothermal working fluid. Residential and commercial building ground-source heat pumps from water-based geothermal systems, which may use a secondary heat exchange fluid (e.g., isobutene) in order to transfer geothermal heat energy from the ground for use, generally require temperatures between about 4 and 38° C.

DEFINITIONS

The terms "subterranean" or "subsurface" or "underground" as used herein, refer to locations and/or geological formations beneath the Earth's surface.

The term "in situ" as used herein, refers to a natural or original position or place of a geologic feature which may be above ground or underground, such that it is located in a place where it was originally formed or deposited by nature and has remained substantially undisturbed over time, such that it is in substantially the same original condition. A geologic feature can be rock, mineral, sediment, reservoir, caprock and the like, or any combination thereof. A geologic feature is further considered to remain "in situ" following minor manmade disturbances used to create and/or position components, such as channels such as injection wells and/or production wells, within, around or near the feature. A feature is also considered to remain "in situ" following minor man-initiated disturbances, such as causing a controllable or limited amount of rock, mineral, sediment or soil to become dislodged as a result of the minor manmade or natural disturbance. In contrast, a feature is not considered to remain "in situ" following any type of large-scale manmade disturbances, including large-scale hydrofracturing (such as to create an artificial reservoir), or man-initiated disturbances, such as permanent deformation of a geologic feature, earthquakes and/or tremors following large-scale hydrofracturing, all of which can have a further negative impacts on groundwater flow paths, habitats and man-made structures.

The term "large-scale hydrofracturing" as used herein refer to a known method for creating or inducing artificial fractures and/or faults in a feature, such as a rock or partially consolidated sediments, typically during operation of an enhanced geothermal system (EGS). See, for example, U.S. Pat. No. 3,786,858 to Potter, which employs water for hydraulic fracturing of rock to create a thermal geological reservoir from which fluid is transported to the surface. Large-scale hydrofracturing is known to create unintended fluid flow pathways that can result in fluid loss or "shortcutting," which in turn decreases geothermal heating efficiencies of the working fluid. Large-scale hydrofracturing can also cause (micro-) seismicity and damages to natural and/or manmade structures.

The term "rock" as used herein, refers to a relatively hard, naturally formed mineral, collection of minerals, or petrified matter. A collection of rocks is commonly referred to as a "rock formation." Various types of rocks have been identified on Earth, to include, for example, igneous, metamorphic, sedimentary, and the like. A rock can erode or be subject to mass wasting to become sediment and/or soil proximate to or at a distance of many miles from its original location.

The term "sediment" as used herein, refers to a granular material eroded by forces of nature, but not yet to the point of becoming "soil." Sediment may be found on or within the Earth's crust. A collection of sediments is commonly referred to as a "sediment formation." Sediment is commonly unconsolidated, although "partially consolidated sediments" are often referred to simply as "sediments" and are therefore considered to be included within the definition of sediment.

The term "soil" as used herein, refers to a granular material comprising a biologically active, porous medium. Soil is found on, or as part of, the uppermost layer of the Earth's crust and evolves through weathering of solid materials, such as consolidated rocks, sediments, glacial tills, volcanic ash, and organic matter. Although often used interchangeably with the term "dirt," dirt is technically not biologically active.

The term "fluid" as used herein, refers to a liquid, gas, or combination thereof, or a fluid that exists above the critical point, i.e., a supercritical fluid. A fluid is capable of flowing, expanding and/or accommodating a shape of its physical surroundings. A fluid can comprise a native fluid, a working fluid, or combinations thereof. Examples of fluid include, for example, air, water, brine (i.e., salty water), hydrocarbon, $CO_2$, magma, noble gases, or any combination thereof.

The term "native fluid" as used herein, refers to a fluid which is naturally resident in a rock formation or sediment formation. A native fluid includes, but is not limited to, water, saline water, oil, natural gas, hydrocarbons (e.g., methane, natural gas, oil), and combinations thereof. Carbon dioxide can also be a naturally present in the rock or sediment formation and thus constitute a native fluid in this case.

The term "working fluid" as used herein, refers to a fluid which is not native to a rock formation or sediment formation and which may undergo a phase change from a gas to a liquid (energy source) or liquid to gas (refrigerant). A "working fluid" in a machine or in a closed loop system is the pressurized gas or liquid which actuates the machine. A working fluid includes, but is not limited to ammonia, sulfur dioxide, carbon dioxide, and non-halogenated hydrocarbons such as methane. Water is used as a working fluid in conventional (i.e., water-based) heat engine systems. A working fluid includes a fluid in a supercritical state as the term is understood in the art. Different working fluids can have different thermodynamic and fluid-dynamic properties, resulting in different power conversion efficiencies.

The term "pore space" as used herein, refers to any space not occupied by a solid (rock or mineral). Pore space can be the space formed between grains and/or the space formed by fractures, faults, fissures, conduits, caves, or any other type of non-solid space. Pore space can be connected or unconnected and it may, or may not, evolve over time due to changes in solid space volume and/or size (which could come from reactions, deformations, etc.). A pore space is filled with fluid, as the term is understood in the art.

The term "$CO_2$ plume" as used herein, refers to a large-scale (meters to several kilometers to tens of kilometers in diameter) $CO_2$ presence within subsurface pore spaces (as defined above, where a significant percentage of the fluid in the pore space is CO2.

The term "reservoir" or "storage rock formation" or "storage sediment formation" as used herein, refers to a rock formation and/or sediment formation capable of storing an amount of fluid substantially "permanently" as that term is understood in the geological arts.

The term "geothermal heat flow" as used herein, refers to any kind of heat transfer in the subsurface and consists of conductive and/or advective (sometimes referred to as convective) and/or radiative heat transfer, with radiative heat transfer typically being negligible in the subsurface. A "low" heat flow is generally considered to be less than about 50 milliwatts per square meter. A "moderate" heat flow is generally considered to be at least about 50 to about 80 milliwatts per square meter. A "high" heat flow is generally considered to be greater than 80 milliwatts per square meter.

The term "injection well" as used herein, refers to a well or borehole which is optionally cased (i.e., lined) and which may contain one or more pipes through which a fluid flow (typically in a downwardly direction) for purposes of releasing that fluid into the subsurface at some depth. An injection well may exist in the same borehole as a production well.

The term "production well" as used herein, refers to a well or borehole which is optionally cased (i.e., lined) and which may contain one or more pipes through which a fluid can flow (typically in an upwardly direction) or purposes of bringing fluids up from the subsurface to (near) the Earth's surface. A production well may exist in the same borehole as an injection well.

The term "enhanced geothermal system" (EGS) as used herein, refers to a system in which a manmade (i.e., artificial) reservoir is created, usually by means of hydrofracturing the subsurface, i.e., inducing fractures to create space which may contain significant amounts of fluid. Such artificial reservoirs are typically much smaller than natural reservoirs The term "conventional water-based geothermal system" as used herein, refers to a geothermal system that utilizes water as the (subsurface) working fluid. This could be in natural reservoir systems or in hydrofractured (i.e., EGS) systems.

The term "conventional $CO_2$-based EGS" refers to a conventional EGS system which uses carbon dioxide as the working fluid.

DESCRIPTION OF EMBODIMENTS

Figure 2:
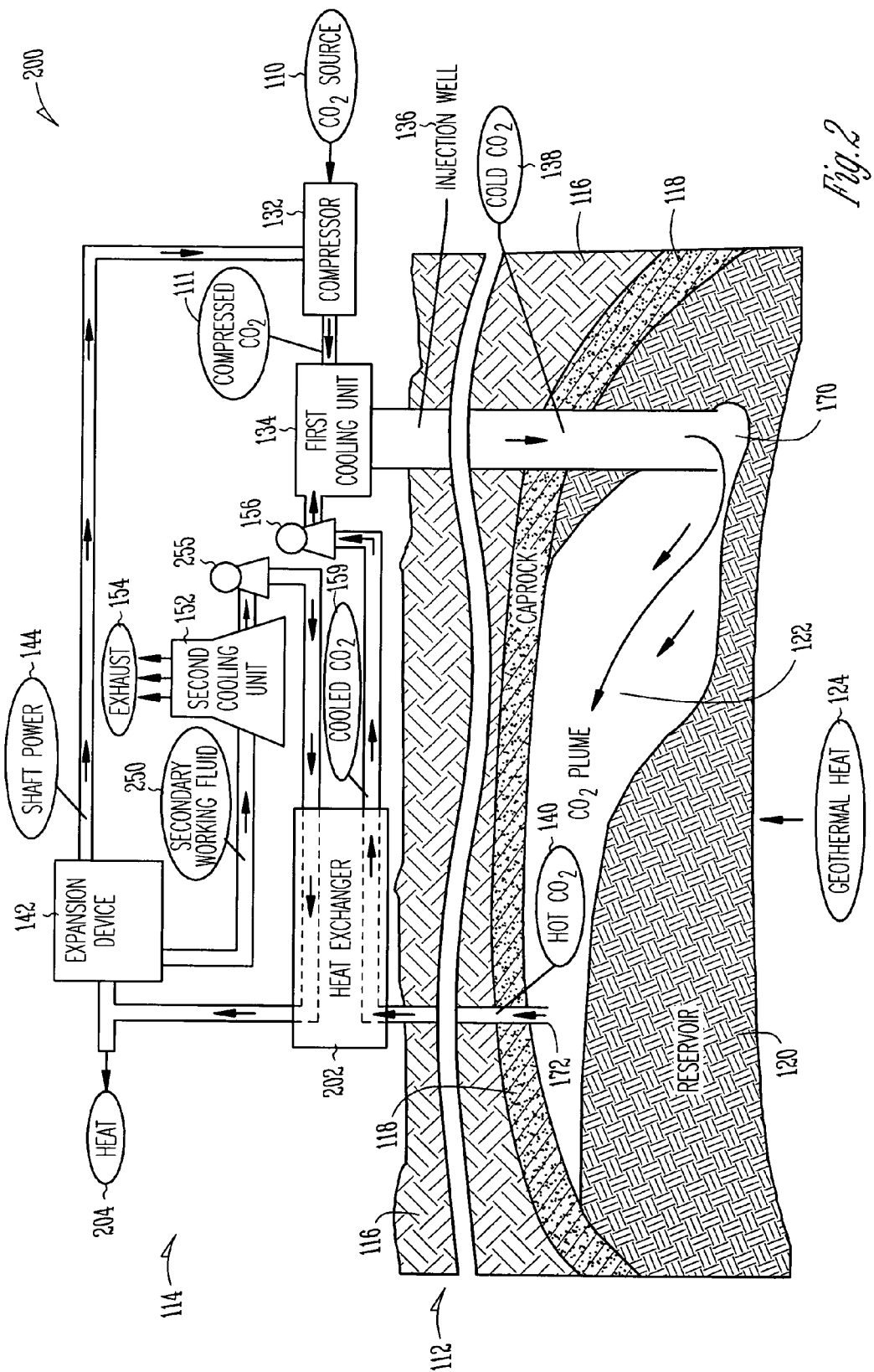
FIG. 2 is a simplified schematic diagram of an alternative energy generation system according to an embodiment of the invention.
Figure 3:
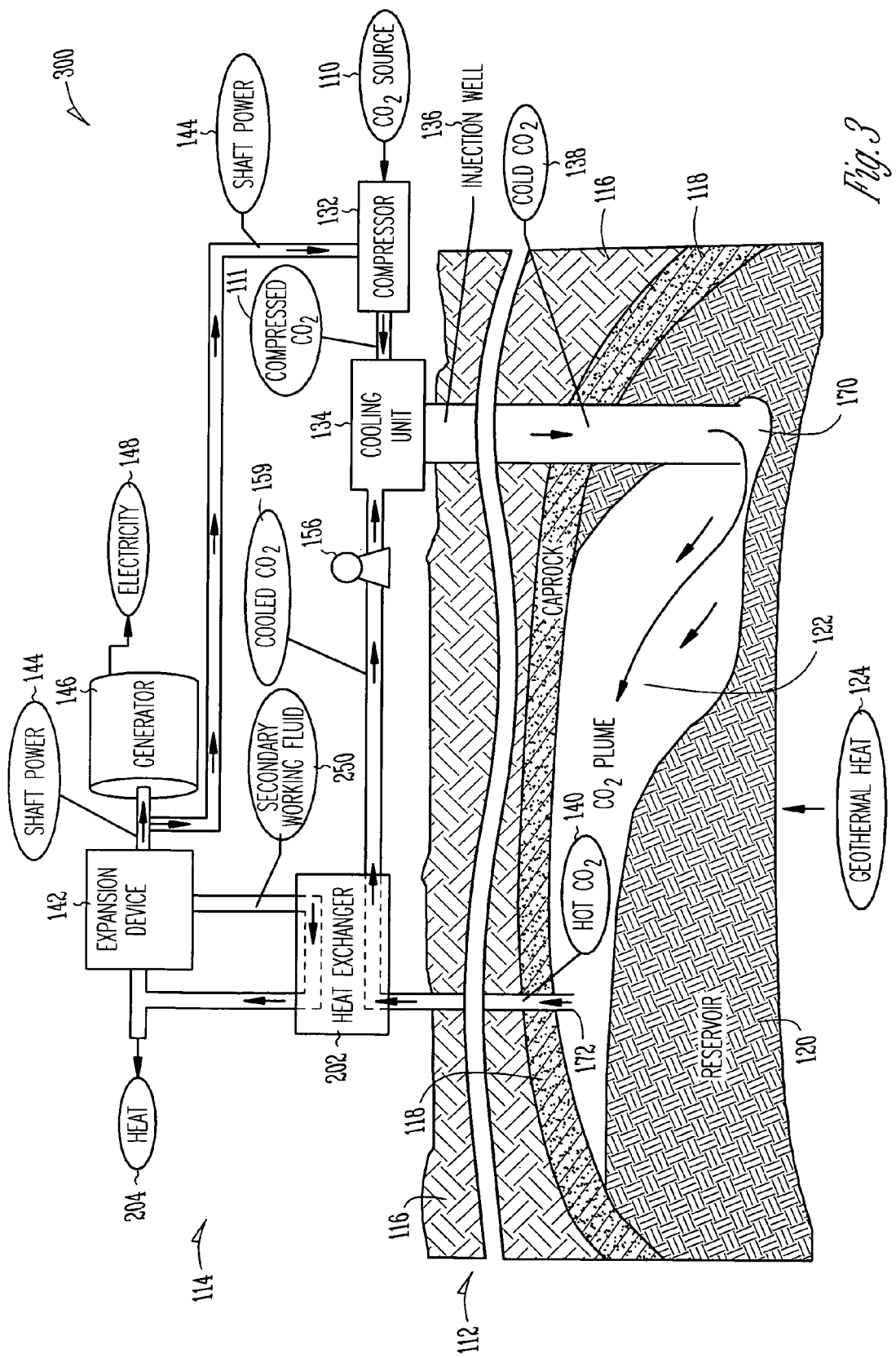
FIG. 3 is a simplified schematic diagram of another alternative energy generation system according to an embodiment of the invention.
Figure 4:
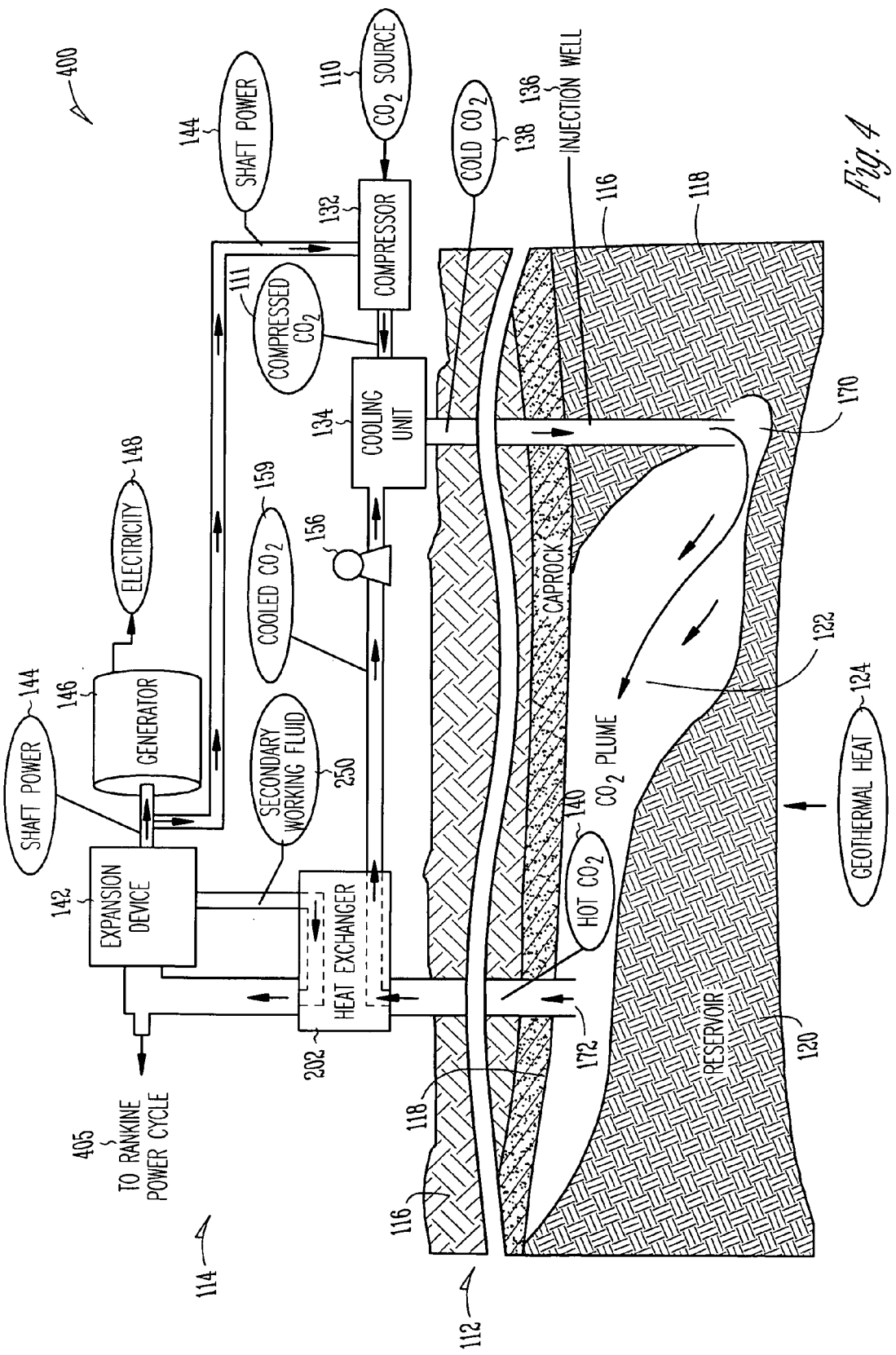
FIG. 4 is a simplified schematic diagram of yet another alternative energy generation system according to an embodiment of the invention.

In one embodiment, a system 100 generates energy from a source, such as a carbon dioxide ($CO_2$) source 110 using a $CO_2$ sequestration component 112 and a geothermal energy production component 114, as shown in FIG. 1. In one embodiment, the energy generated is thermal energy (i.e., heat), although the invention is not so limited. In one embodiment, the energy produced is used to generate electricity, as shown in FIG. 1. In an alternative embodiment, the energy is drawn off as heat, as shown in FIG. 2. In yet other embodiments, the energy is used to provide electricity and heat, as shown in FIG. 3, or to provide heat to operate a separate power cycle, such as an organic Rankine cycle, as shown in FIG. 4. Other variations and embodiments are possible, as discussed herein.

The source (e.g., $CO_2$ source 110) can be any suitable fluid (including a fluid containing solids, in dissolved or non-dissolved form, capable of absorbing thermal energy from its surroundings, and further releasing the thermal energy as described herein. In most embodiments, the source may be a waste stream from a power plant, such as a fossil fuel power plant (e.g., coal plant, natural gas plant, and the like), or any type of plant capable of producing fuel, such as biofuel (e.g., ethanol plant) or any type of industrial plant, such as a cement manufacturer, steel manufacturer, and the like. In one embodiment, the fluid is further capable of being transported via any suitable means, (e.g., pipe, various transportation means, such as truck, ship or rail), over a desired distance. Although the source, such as the $CO_2$ source 110 can, in most instances, be used "as is", in some instances, further processing may be used prior to introducing the $CO_2$ source 110 to a compressor 132 to produce a working fluid, such as cold $CO_2$ 138, as shown in FIG. 1. For example, some waste streams may require dewatering and/or drying. In one embodiment the $CO_2$ source 110 is stored on site or off site for a period of time. In one embodiment, the cold $CO_2$ 138 is supercritical $CO_2$.

In one embodiment, the system 100 is located at a site (i.e., in a position) configured to provide access to a target formation, the target formation comprising a caprock 118 located above a reservoir 120 as shown in FIG. 1. In one embodiment, the reservoir 120 has a natural temperature higher than a temperature of the working fluid. In the embodiment shown in FIG. 1, the natural temperature in the reservoir 120 is affected by geothermal heat 124 flowing up from below.

A top layer 116 may be located above the caprock 118 and reservoir 120 as shown in FIG. 1. The top layer 116 may comprise any number of layers and types of natural deposits and/or formations. For example, the top layer 116 may contain one or more features such as a reservoir (e.g., reservoir 120) or caprock (e.g., caprock 118) having the features as described herein. In one embodiment, the top layer 116 additionally or alternatively contains additional areas suitable for injection of the working fluid, such as the cold $CO_2$ 138 shown in FIG. 1. In one embodiment, the top layer 116 additionally or alternatively further comprises any type of rocks, including rocks or sediments in layers, rock or sediment formations, and the like, or any combinations thereof. In one embodiment, the top layer 116 additionally or alternatively comprises a top layer or layers of sediment and/or soil of varying depths. The permeability and/or porosity of the top layer 116 may vary widely, as long as drilling can be performed to insert the injection well 136 and production well 160 as described below, without using large-scale hydrofracturing.

In one embodiment, the top layer 116 can include a variety of geologic features, including, but not limited to, soil, sand, dirt, sediment, and the like, or combinations thereof. The top layer 116 may further have a wide range of depths (i.e., "thickness") sufficient to ensure working fluid introduced into the reservoir 120 remains in the desired state, such as a supercritical state. In one embodiment, the depth of the top layer 116 is at least 100 meters (m) or more, up to one (1) kilometer (km), further including more than one (1) km, such as up to three (3) km, four (4) km, five (5) km, or more, such as up to 10 km or over 15 km including any range there between, such as one (1) to five (5) km, below the Earth's surface (i.e., below or within a given topography in an area, which may or may not be exposed to the atmosphere). In most embodiments, however, it is expected that the target formations are located between about 800 m and about four (4) km beneath the Earth's surface.

Factors that can be considered in selecting reservoir depths can also vary according to local geology (e.g., specific rock type, geothermal heat flow rates, subsurface temperatures), access to working fluid (e.g., carbon dioxide from fossil fuel burning power plants, ethanol plants), drilling and operation costs, and sociopolitical circumstances (e.g., consumer locations, constructs, electric grid locations, and the like).

The target formation, comprising the caprock 118 and reservoir 120, can be made up of a variety of rock types, including, but not limited to, igneous rock, metamorphic rock, limestone, sedimentary rock, crystalline rock, and combinations thereof. In one embodiment, the target formation is a sedimentary basin having a substantially bowl or convex shape as shown in FIG. 4. In other embodiments, the target formation have another shape, such as the substantially dome or concave shape as shown in FIGS. 1-3, although the invention is not limited to the shapes depicted in FIGS. 1-4. In one embodiment, the target formation is a saline aquifer or a saline water-filled rock formation (e.g., reservoir 120) containing a native fluid which is inhibited or prevented from escaping upwardly, due to the presence of the caprock 118. It is further understood that a target formation may contain a fault which can offset the target formation or a portion of the target formation, thereby forming a geological trap, as the term is understood in the art. In another embodiment, the target formation is a reservoir containing natural gas and/or oil and/or fresh water.

In one embodiment, $CO_2$, such as the cold $CO_2$ 138 shown in FIG. 1, is used as the working fluid in combination with a reservoir 120 located at least about 0.1 km, to about 4 km deep. Such a combination can minimize upward leakage of the working fluid, since additional caprocks 118 may be present between the reservoir 120 and the Earth's surface. Additionally, higher natural reservoir temperatures (i.e., greater than about 70° C.) and higher pressures (i.e., greater than about 8 MPa) may be encountered at such depths. Larger depths can also increase the likelihood of the presence of dissolved salts and other minerals in the native fluid, which may reduce the likelihood that such native fluid would otherwise be useful for drinking and irrigation applications.

The caprock 118 shown in FIG. 1 is a geologic feature having a very low permeability, i.e., below about $10^{-16}$ $m^2$. Such a low permeability allows the caprock 118 to essentially function as a barrier for fluid contained in the reservoir 120 below. Permeability may also be dependent, in part, on the depth (i.e., thickness) of the caprock 118, as well as the depth of the top layer 116 above. The porosity of the caprock 118 can vary widely. As is known in the art, even if a rock is highly porous, if voids within the rock are not interconnected, fluids within the closed, isolated pores cannot move. Therefore, as long as the caprock 118 exhibits permeability sufficiently low to allow it to prevent or inhibit fluid leakage from fluid in the reservoir 120, the porosity of the caprock 118 is not limited.

The thickness of the caprock 118 can vary, but is generally substantially less than the thickness of the top layer 116. In one embodiment, the top layer 116 has a thickness on the order of 10, or 10 to 100, up to 1000 times the thickness of the caprock 118, further including any range there between, although the invention is not so limited. In one embodiment, the thickness of the caprock 118 can vary from about one (1) cm up to about 1000 m or more, such as between about five (5) cm and 1000 m, such as between about one (1) m and about 100 m. In one embodiment, the caprock 118 represents more than one caprock 118, such that multiple caprocks are present which partially or completely cover one another and may act jointly as a caprock 118 to prevent or reduce upward leakage of the working fluid from the reservoir 120.

The reservoir 120 can be one or more natural underground rock reservoirs capable of containing fluids. In one embodiment, the reservoir 120 is a previously-created manmade reservoir or a portion of a previously-created manmade reservoir, such as, for example, shale formations remaining from shale fracturing for hydrocarbon removal. In one embodiment, the reservoir 120 is also capable of storing carbon dioxide on a substantially "permanent" basis, as this term is understood in the art. In most embodiments, the reservoir 120 is sufficiently porous and permeable to be able to sequester fluids, such as carbon dioxide, and to receive and retain geothermal heat 124. In contrast to conventional enhanced geothermal systems, there is no requirement that the reservoir 120 be a hot dry rock reservoir, as that term is understood in the art, although, as noted herein, the such a reservoir can optionally be used In one embodiment, the reservoir 120 is sufficiently permeable to allow multidirectional routes for dispersion or flow of fluid at relatively high rates, including lateral dispersion or flow. The presence of the caprock 118 above the reservoir 120 further enhances the dispersion capabilities of the reservoir 120. In one embodiment, the porosity of the reservoir 120 ranges from between about four (4) % to about 50% or greater, such as up to about 60%.

The reservoir 120 is also sufficiently permeable to allow fluids to flow relatively easily, i.e., at a rate of about 0.1 to about 50 liters/minute (L/min). In one embodiment, the reservoir 120 has a permeability of about $10^{-16}$ m$^2$ to about $10^{-9}$ m$^2$, or greater, such as up to about $10^{-6}$ m$^2$.

In an exemplary embodiment, the reservoir 120 has a porosity of at least about (4) % and a permeability of at least about $10^{-15}$ m$^2$, with the caprock 118 having a maximum permeability of about $10^{-16}$ m$^2$. (See also Example 1).

The reservoir 120 can have any suitable natural temperature. In one embodiment, the natural temperature of the reservoir 120 is at least about 90° C., although the invention is not so limited. In one embodiment, natural temperatures below 90° C., such as down to 80° C. or 70° C., further including down to 30° C., including any range there between, are present. Natural temperatures greater than 90° C. may also be present, with the highest temperature limited only by the amount of geothermal heat 124 provided and the ability of the reservoir 120 to capture and retain the geothermal heat 124. It is possible that temperatures greater than about 300° C. may be present in the reservoir 120.

In one embodiment, a specific desired natural temperature is obtained by varying the depth of the injection well 136 or the production well (i.e., recovery well) 160. In one embodiment, higher natural temperatures are obtained by increasing the depth of the injection well 136, with or without increasing the depth of the production well 160. Unlike conventional geothermal energy systems which utilize water as the working fluid, however, the natural temperatures used to generate energy in the novel non-water based geothermal systems described herein, in amounts sufficient to produce electricity, for example, are much lower.

The depth of the reservoir 120 can vary as noted above. Additionally, the overall size of the reservoir 120 can also vary.

The geothermal heat 124 can flow at any suitable rate, including at a high rate as is present in "high geothermal heat flow regions", as the term is understood in the art. Conventional water-based systems are known to require high geothermal heat flow in most instances. As a result, as compared to conventional systems using water as the working fluid, the novel systems described herein can operate in a wider range of locations, including low and moderate geothermal heat flow regions. Also in contrast to conventional water-based systems which may choose to operate in areas containing little natural water (e.g., American Southwest), thus requiring importation of water, the novel systems described herein do not rely on water as the working fluid, and thus do not import water for use as a working fluid. It is to be understood, that areas having medium or low geothermal heat flow rates can also be used.

Additionally, water in a conventional EGS tends to react extensively with rocks causing mineral precipitation and/or wall rock dissolution reactions. In contrast, substantially pure $CO_2$ (for example, $CO_2$ in the center of the $CO_2$ plume 122) is expected to result in very limited to no rock/mineral-fluid reactions. Some limited reactions may occur at the (narrow) $H_2O$—$CO_2$ interface. Extensive fluid-mineral/rock interactions can have often have adverse effects due to fluid flow path modifications, since flow constrictions can be formed due to mineral/rock/sediment precipitations with "short-circuiting" resulting from mineral/rock/sediment dissolution. However, limited reactions can have beneficial effects in the form of permeability and/or porosity enhancement.

As noted above, the system 100 of FIG. 1 comprises a $CO_2$ sequestration component 112 and a geothermal energy production component 114. $CO_2$ sequestration is accomplished by providing the $CO_2$ source 110 to an optional compressor 132 to produce compressed $CO_2$ 111 (i.e., $CO_2$ having a temperature of about zero (0) to about 50° C. and pressure of about three (3) to about seven (7) MPa). The compressed $CO_2$ 111 can optionally pass through a first cooling unit 134 to produce a working fluid, such as cold $CO_2$ 138 (i.e., saturated liquid $CO_2$ having a temperature less than about 30° C. and pressure of about three (3) to about seven (7) MPa), before entering the injection well 136, as shown in FIG. 1, where it flows in a substantially downwardly direction below the Earth's surface. Upon its release at an injection well reservoir opening 170, the cold $CO_2$ 138 permeates the reservoir 120 forming a CO2 plume. Upon exposure to the temperatures present in the reservoir 120 (which are higher than the temperature of the cold $CO_2$ 138), the cold $CO_2$ 138 absorbs heat from the reservoir 120, thus causing an upwardly-migrating $CO_2$ plume 122, which, in one embodiment, may be laterally advected due to non-zero groundwater flow velocities within the reservoir 120, as shown in FIG. 1. In one embodiment, lateral migration occurs additionally or alternatively due to the $CO_2$ plume spreading, as additional $CO_2$ exits the injection well 170.

The $CO_2$ plume 122, which can further contain an amount of native fluid (partially dissolved in the $CO_2$ plume or included as individual bubbles or fluid pockets), migrates, is transported (such as in a closed loop system as described herein) and/or flows and/or spreads towards the production well 160, entering a production well reservoir opening 172 as hot $CO_2$ 140 (i.e., fluid $CO_2$ having a temperature greater than about 30° C.). The $CO_2$ plume 122 can move at any suitable rate in a substantially horizontal manner across the reservoir 120. In one embodiment, the $CO_2$ plume 122 moves at a rate of about 0.1 to about one (1) m/day, such as about 0.4 to about 0.6 m/day, although the invention is not so limited. When the $CO_2$ plume 122 reaches the production well reservoir opening 172 as hot $CO_2$ 140, it can be transported and/or buoyantly move in a generally upwardly direction towards the Earth's surface. In the embodiment shown in FIG. 1, the hot $CO_2$ 140 enters an expansion device 142 to produce shaft power 144 which can be provided to a generator 146 to produce electricity 148 and to the compressor 132.

Warm $CO_2$ 150 (i.e., gaseous $CO_2$ having a temperature between about zero 0° and about 30° C. and a pressure between about three (3) and about seven (7) MPa) is also drawn off the expansion device 142 for use within the system 100, to provide part of the required load used during operation, thus providing a "power cycle." As such, the warm $CO_2$ 150 is provided to the second cooling unit 152, where exhaust 154 (warmed air or water or water vapor) is released, while cooled $CO_2$ 157 can be provided to the first cooling unit 134 to repeat the power cycle, after optionally passing through a pump 156.

A variety of working fluids can be employed in the novel systems and methods described herein. The working fluid used in the carbon dioxide sequestration component 112 of the system 100 shown in FIG. 1, is cold $CO_2$ 138 obtained from a $CO_2$ source 110. Such a working fluid can further contain entrained contaminants. In contrast, the working fluid useful in the substantially above-ground geothermal energy production component 114 of the system 100 may be any suitable secondary working fluid 250 as is understood in the art. (See FIGS. 2-4). In one embodiment, the working fluid for either the $CO_2$ sequestration component 112 or the geothermal energy production component 114 with a non water-based fluid, i.e., any fluid which is thermodynamically more favorable than water (i.e., having a higher condensing pressure and higher vapor density at ambient temperature). In one embodiment, one or more supercritical fluids are used as the working fluid for either or both components, 112 and 114.

In a particular embodiment, supercritical carbon dioxide is used as the working fluid in the $CO_2$ sequestration component 112 and/or the geothermal energy production component 114. Supercritical carbon dioxide has an increased density, as compared with other working fluids, such as gaseous carbon dioxide, such that a greater amount can be stored in a smaller volume, thus increasing system efficiency. Additionally, and in particular for the $CO_2$ sequestration component 112, supercritical carbon dioxide has favorable chemical properties and interaction characteristics with water (such as saline water), as is known in the art. Supercritical carbon dioxide can also be used in colder conditions, as compared with water-based geothermal systems, since it has a lower freezing point of about −55° C. (as compared to approximately 0° C. for water) depending on pressure. As such, a carbon dioxide-based system can be used in temperatures much lower than 0° C., such as down to −10° C. or −20° C. or −30° C. or below, down to about −55° C., including any range there between. A larger temperature differential between the heat sink (atmosphere or ambient air) and the heat source (reservoir 120), also increases the overall efficiency of the system. The use of carbon dioxide, in one embodiment, as the working fluid in the $CO_2$ sequestration component 112 allows for sequestering of carbon dioxide.

In one embodiment, the working fluid in the $CO_2$ sequestration component 112 (e.g., cold $CO_2$ 138) is released directly into the reservoir 120 where it becomes a $CO_2$ plume 122, which is allowed to flow through natural pores, fractures and conduits present in the reservoir 120 in the area between the injection well reservoir opening 170, where it eventually becomes hot $CO_2$ 140, before entering a production well reservoir opening 172 of the production well 160, as shown in FIG. 1. Such a flow pattern is referred to herein as an "open" flow cycle. In this embodiment, the working fluid can displace and/or commingle with any native fluid(s) present. In this embodiment, heat exchange between the reservoir 120 and the working fluid (e.g., cold $CO_2$ 138) is facilitated and heat energy extraction is increased, as compared to a "closed" system in which the working fluid travels only through man-made pipes located in the reservoir 120 between the injection well reservoir opening 170 and the production well reservoir opening 172. Additionally, any fluid loss occurring in an open cycle is simply sequestered in the reservoir 120. In one embodiment, a partially open cycle is used. In one embodiment a closed cycle is used. The injection well reservoir opening 170 and the production well reservoir opening 172, the production well 160 are, in one embodiment, located at a distance sufficiently apart from one another to permit adequate heating of the cold $CO_2$ 138 to the desired temperature.

The compressor 132 can comprise any suitable compressor or compressors known in the art. In one embodiment any suitable type of pump replaces the compressor 132. In one embodiment, no compressor 132 is used, such as when the $CO_2$ source 110 is provided at a sufficiently high pressure (i.e., greater than about six (6) MPa). In one embodiment, no compressor 132 (or pump) is used and the first cooling unit 134 is a condenser which provides a saturated liquid at ambient temperature and corresponding saturation pressure (e.g., CO2) for injection into the injection well 136, thus maximizing the density of the working fluid as well as the thermosyphon effect within the injection well 136.

In one embodiment, when the ambient temperature rises, and thus the corresponding saturation pressure also rises in the condenser or second cooling unit 152, the decrease in liquid density provided to the injection well reduces the hydrostatic head in the injection well. In one embodiment, as described in the Example section, the higher condensing pressure surprisingly compensates for this decreased density effect at a level sufficient to maintain the deep rock cavity (i.e., reservoir 120) pressure regardless of changing surface conditions without using a compressor 132 (or pump). Such a configuration allows for reduced start-up and operating costs.

Use of the first cooling unit 134 ensures that all of the carbon dioxide injected into the injection well 136 will be fluid at the same pressure and temperature, regardless of whether it comes from the $CO_2$ source 110 or as cooled $CO_2$ 157 from the power cycle. Any suitable type or types of cooling unit can be used for the first cooling unit 134. The first cooling unit 134 further minimizes the amount of pumping action needed to increase pressure at the injection well 136, since less power is needed to pump a liquid to a higher pressure than a gas. Use of the first cooling unit 134 also helps to maximize any natural thermosyphon effect present (i.e., passive heat exchange based on natural convection which circulates liquid), by providing the injection well 136 with cold $CO_2$ 138 at all times, although the invention is not so limited. In one embodiment, there is no first cooling unit 134. In one embodiment, the first cooling unit 134 is a condenser cooled by any suitable cooling means, such as with a water-antifreeze solution (e.g., glycol), with the cooling means in turn cooled by ambient air in the condenser.

The injection well 136 can be any suitable type of channel that allows the working fluid to move substantially downwardly. In one embodiment, the injection well 136 comprises more than one injection well. Depending on a particular site's history of heat extraction and on the geologic circumstances in the area (e.g., geologic layers at depth, geothermal temperatures and heat flow rates), as well as the socio-political circumstances (instance to users and/or electrical grid, $CO_2$ source availability and distance, etc.), multiple injection wells may be located in patterns and inject the working fluid ($CO_2$) at various depths and rates to maximize the energy output of the power plant, maximize $CO_2$ sequestration, minimize subsurface heat depletion or a combination thereof.

In one embodiment, the injection well 136 and the production well 160 comprise a single channel or shaft with two or more pipes extending there from. In this embodiment, the injection "pipe" is deeper than the production "pipe."

Similarly, the production well 160 can be any suitable type of channel that allows the working fluid to move substantially upwardly. In one embodiment, the production well 160 comprises more than one production well. As with the injection well 136, patterns, depths, and $CO_2$ extraction rates of the production well 160 may be optimized.

In one embodiment, the injection well 136 comprises more than one injection well distributed in various locations and one or more production wells 160 are more centrally located. In this embodiment, the ambient temperature liquid coming out of the first cooling unit 134 can be provided to the sites of the various injection wells 136 through gravity-sloped small pipes (e.g., high density, low volumetric flow rate) with little or no thermal insulation required. The hot vapor, such as the hot $CO_2$ 140 in the production well 160 is provided more directly to the geothermal energy production component 114, wherein pipe sizes may need to be larger to handle the higher volumetric flow rate and thermal insulation required.

The locations of the injection well 136 in relation to the production well 136 can be determined by any suitable means, including accessing geological data, such as from the U.S. Geological Survey pertaining to the particular target formation, and performing computer modeling, such as described in the Example section, in order to be able to predict and optimize conditions within the reservoir 120, such that, for example, the production well reservoir opening 172 of the production well 160 is at a point where the $CO_2$ plume 122 is at a sufficiently high temperature to become hot $CO_2$ 140. In one embodiment, the injection well 136 and production well 160 are located at a distance sufficient to ensure that the working fluid (e.g., the cold $CO_2$ 138) increases in temperature by at least about 10° C. from the injection well reservoir opening 170 and the production well reservoir opening 172. Such distance can be a lateral distance, a vertical distance, or a combination thereof.

In one embodiment, the roles of the injection and production wells, 136 and 160, respectively, are reversed after a period of time to improve subsurface heat exchange within the reservoir 120. In one embodiment, the injection and production wells are reversed every few months or about every one (1) year up to about every five (5) years or any period there between.

The expansion device 142 can comprise any suitable type of expansion device 142 known in the art, including any type of turbine, although the invention is not so limited. In contrast to conventional water-based geothermal systems which produce low pressure steam at high volumetric flow rates, the use of a conventional turbine in higher pressure $CO_2$ geothermal energy systems and methods described herein, is an option, rather than a requirement In one embodiment, the expansion device 142 is one or more piston-cylinder devices. In one embodiment, the expansion device 142 is one or more scroll, screw or rotary compressors designed to run in reverse as engines. In one embodiment, the expansion device 142 comprises more than one expansion device 142. In one embodiment, multiple expansion devices 142 run in parallel, with some running pumps or compressors directly and others producing electric power for sale.

The generator 146 can be any suitable generator known in the art, to produce electricity 148. The second cooling unit 152 can be any suitable type of cooling unit as is known in the art. In one embodiment, the second cooling unit 152 is a dry cooling tower in which the exhaust 154 is released to ambient air. In one embodiment, the second cooling unit 152 is a wet cooling tower in which the exhaust 154 is released into the air by also evaporating a volume of water. In one embodiment, a dry cooling tower is used during colder conditions and a wet cooling tower is used during warmer conditions. Use of a wet cooling tower during warmer conditions can increase plant efficiency, as is known in the art.

The pump 156 shown in FIG. 1 is also optional and may be any suitable type of pump 156 as is known in the art to move the cooled $CO_2$ 157 (e.g., direct lift, displacement, velocity, buoyancy, gravity, and the like) exiting the second cooling unit 152 prior to its return to the first cooling unit 134.

In an alternative embodiment, the reservoir 120 is also used as a cooling unit to cool warm $CO_2$ 150 exiting the expansion device 142, with the appropriate piping and pumps provided as is known in the art.

In one embodiment, a geothermal energy system is provided, comprising a subterranean fluid transport system comprising an ingress channel (into the reservoir) and egress channel (out of the reservoir), each of the ingress and egress channels having respective proximal ends and distal ends relative to the surface; a natural subterranean porous in situ rock formation; a working fluid, the supercritical fluid being introduced into the rock formation starting at the proximal end and moving toward the distal end of the ingress channel. The fluid is withdrawn in part at the distal end of the ingress channel so as to form a subterranean fluid reservoir integral with the rock formation; and wherein the fluid is heated by the rock formation prior to transport toward the surface and proximal end 1 of the egress channel.

The system can comprise a compressor located in-line and integrated as part of the ingress channel to facilitate movement of the fluid toward the rock formation (i.e., reintroduction). The heated plume is formed as part of the migration through the rock toward the intake at the egress channel distal end. In the interim, the fluid absorbs the natural geothermal heat associated with the rock formation. Once the heated fluid travels toward the surface, the egress channel proximal end can be associated with a turbine and generator system, whereby electrical energy is produced and distributed to the consumer(s). Alternatively, the heat energy can be incorporated into system for district space and water heating applications (not illustrated).

In one embodiment, the subsurface-heated working fluid, as a primary working fluid, can be directly introduced into a turbine assembly as part of a turbine-generator system to generate electricity. In this embodiment, it is preferable to remove water or other ingredients as might be present within the primary working fluid.

In an additional embodiment, a plurality of ingress channels can be employed in combination with a single egress channel. Alternatively, a plurality of egress channels can be constructed, using a single ingress channel. Further yet, both a plurality of ingress channels and a plurality of egress channels can be constructed within a unitary system. Various arrangements are possible with the invention. Arrangements using multiple systems at a land surface area using different parts of the same rock formation strata, or using separate and distinct rock formations at different depth and space parameters are contemplated.

In an additional embodiment of the invention, an additional transport channel can be constructed for the transport of external carbon dioxide sources. Examples of external carbon dioxide sources include, but are not limited to, fossil fuel power plants, ethanol plants, and the like. When direct turbine-generator systems are used, a water removal component may be incorporated into the system.

In one embodiment, the novel systems and methods described herein are constructed to permit maintenance desired for optimal operation of the system. For example, the working fluid supply channel (ingress channel) can be structured to permit its removal for maintenance (e.g., cleaning), or intermittent removal for a period of time to create a temporary closed cyclic system. The system can also be constructed to receive and accommodate multiple industrial carbon dioxide supply lines from different sources as part of the system.

In an alternative embodiment, as shown in FIG. 2, the hot $CO_2$ 140 passes through a heat exchanger 202 where it is used to warm a secondary working fluid 250 also cycling through the heat exchanger 202 (through the second cooling unit 152 and pump 255 as shown). The heated secondary working fluid (temp>about 30° C.) is released as heat 204, which can be used in any direct use application and/or as a ground-source heat pump, using components well known in the art. A portion of the heated secondary working fluid enters the expansion device 142 to produce shaft power 144 which is provided to the compressor 132 where the cycle is repeated. Meanwhile, the hot $CO_2$ 140 exits the heat exchanger 202 as cooled $CO_2$ 159 (i.e., $CO_2$ having a temperature of two (2) and seven (7) MPa that may be condensed liquid), passing through an optional pump or compressor 156 and finally returned to the first cooling unit 134, where it may be further cooled to become cold $CO_2$ 138, thus repeating the cycle.

In another alternative embodiment, as shown in FIG. 3, both electricity 148 and heat 204 are produced. In this embodiment a second cooling unit (not shown) (e.g., 152 in FIGS. 1 and 2) is used and the heat exchanger 202 as described above is also retained.

In another alternative embodiment, as shown in FIG. 4, electricity 148 is produced and the a portion of the heat exiting the heat exchanger 202 is provided to a separate Rankine power cycle 405 having the components as understood in the art. With a Rankine cycle 405, the condensing pressure is typically subcritical and the highest pressure during the heat addition may be either supercritical or subcritical.

In one embodiment, a novel method is provided comprising pumping $CO_2$ from an emitter (e.g., ethanol or coal-fired power plant) underground into a geothermal reservoir. At certain depths (e.g., about 0.4 to about two (2) km), the reservoir contains salty groundwater unlikely to be used for irrigation or consumption. Alternatively, the reservoir may contain hydrocarbons (oil, natural gas) and the injected $CO_2$ is supercritical $CO_2$ which serves to enhance oil recovery (EOR). As noted above, the target formation comprises a reservoir located underneath at least one very low permeability caprock that prevents the working fluid, e.g., supercritical $CO_2$, from rising to the surface (similar to a natural gas trap). In addition, the depth of the reservoir reduces the chance of $CO_2$ reaching the surface, as multiple other low-permeability layers are likely present above the reservoir.

In one embodiment, $CO_2$ in the reservoir is heated by Earth's geothermal heat flow, which partially replenishes the heat energy transmitted to the $CO_2$. In one embodiment, a small portion of the geothermally-heated $CO_2$ is brought back to the surface where it drives an expansion device and generator, such as a turbine-generator combination. The cooled $CO_2$ can thereafter be returned to the reservoir. In one embodiment, the energy used to pump the $CO_2$ to the subsurface is a small fraction (e.g., substantially zero (0) % to about five (5) %) of the energy provided by the geothermal heat and may also be small in comparison to the electricity produced by the system (e.g. substantially zero (0) % to about 25%).

The various individual components of the system of the invention can be obtained and constructed using conventional equipment and techniques readily available to those in the (geothermal) power plant and carbon dioxide sequestration industries. Site locations can be determined using geological survey data for various regions throughout a given country in combination with the porosity and permeability parameters described herein as suitable for the method and system of the invention.

The specific materials and designs of additional minor components necessary to perform the process, e.g., valves, pumps, lines, and the like, are understood in the art will not be described herein. The apparatus and method of the invention can further be implemented using a variety of specific equipment available to and understood by those skilled in process control art. For example, means for sensing temperature, pressure and flow rates in all of the flow lines may be accomplished by any suitable means. It will also be appreciated by those skilled in the art that the invention can include a system controller.

Specifically, the system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, but are not limited to, devices for sensing temperatures, pressures and flow rates, and transducing the same into proportional electrical signals for transmission to readout or control devices may be provided for in all of the principal fluid flow lines. Such a controller may be a local or remote receiver only, or a computer, such as a laptop or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the invention is not so limited. In one embodiment, the controller has a non-volatile memory comprised of a disk drive or read only memory device that stores a program to implement the above control and store appropriate values for comparison with the process variables as is well known in the art.

In one embodiment, these components are all computer programs executed by a processor of the computer, which operates under the control of computer instructions, typically stored in a computer-readable media such as a memory. In this way, useful operations on data and other input signals can be provided by the computer's processor. The controller also desirably includes an operating system for running the computer programs, as can be appreciated by those within the art. The system controller may also comprise a machine coupled to a control panel. Buttons and dials can be provided on the control panel to allow modification of the values and to control of the carbon dioxide-based energy generating system to take the desired steps described herein. The system controller can also be programmed to ignore data from the various sensors when the operator activates certain other buttons and dials on the control panel as he/she deems necessary, such as fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator (who may be located remotely and optionally controlling more than one system substantially simultaneously) to initiate corrective action either by pushing a specific button or turning a specific dial on the control panel, or by manually adjusting the appropriate valve or device.

Additionally, as is known in the art, in implementing the system described herein, general chemical, mechanical and physical engineering principles must be adhered to, including accounting for the various types of energy and materials being input to and output from the system, in order to properly size the system. This includes not only the energy associated with mass flow, but also energy transferred by heat and work. In some embodiments, the system is optimized for maximum performance utilizing any known optimization methods known in the art.

The invention will be further described by reference to the following examples, which are offered to further illustrate various embodiments of the present invention. It should be understood, however, that many variations and modifications may be made while remaining within the scope of the present invention.

Example 1

Numerical modeling of carbon dioxide migration and storage was conducted using two-dimensional solute (carbon dioxide) injection schemes employing the multiphysics modeling environment COMSOL™ (available from Comsol AB, Burlington, Mass.).

Figure 5:
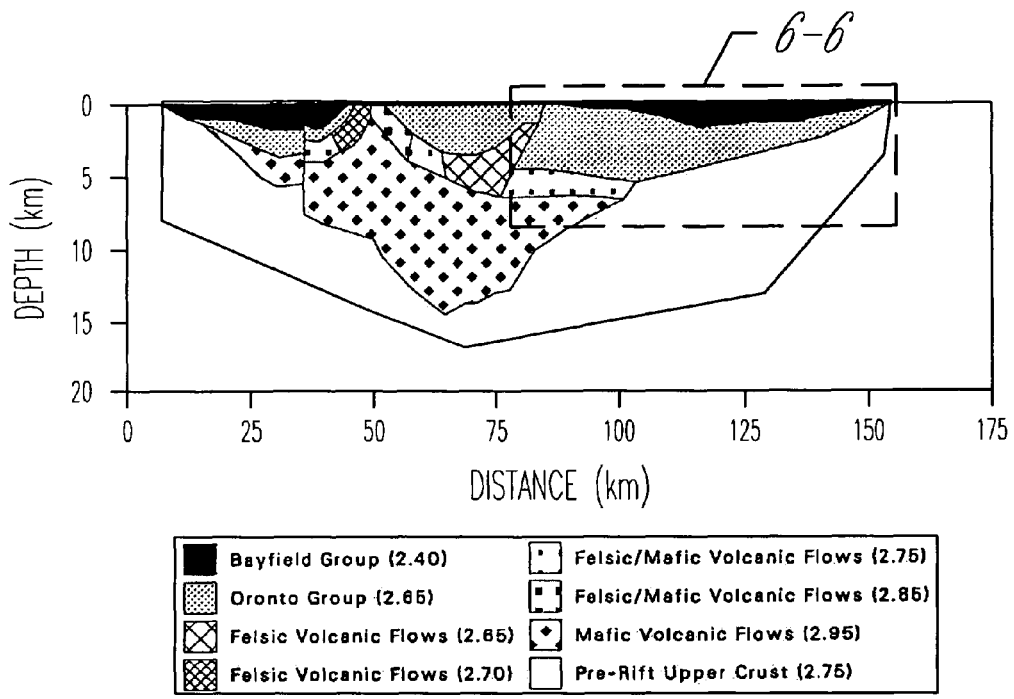
FIG. 5 is a cross-section of Minnesota's Rift System (MRS).
Figure 6:
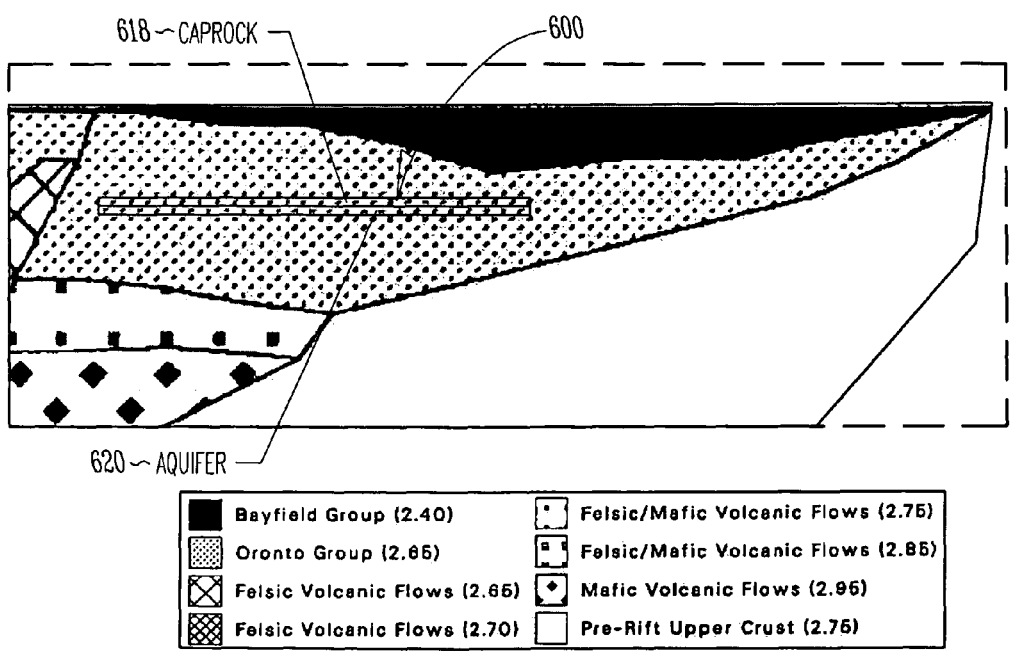
FIG. 6 is an enlarged view of a portion of FIG. 5 taken from within box 6-6 according to an embodiment of the invention.

A generic cross-section of Minnesota's Rift System (MRS) was provided by the Minnesota Geological Survey (MGS) and is shown in FIG. 5. FIG. 6 provides an enlarged view of a portion of FIG. 5, taken from within box 6-6, which is an area that includes the Oronto Group of geological formations, estimated to be about 2.65 million years old. Within the Oronto Group, an area is noted that contains a target formation 600 which includes a caprock 618 and an aquifer 620 which was used for a numerical model of an energy generation system, as described herein. The model can permit estimation of the potential of the Midcontinent Rift System (MRS) for a carbon plume geothermal (CPG) system and the amount of time required for carbon dioxide to move from an injection to a production well.

A carbon dioxide injection model was designed and used to evaluate the spread of injected material over time and to determine whether the caprock 618 can effectively seal a reservoir, such as the aquifer 620 shown in FIG. 6.

Figure 7:
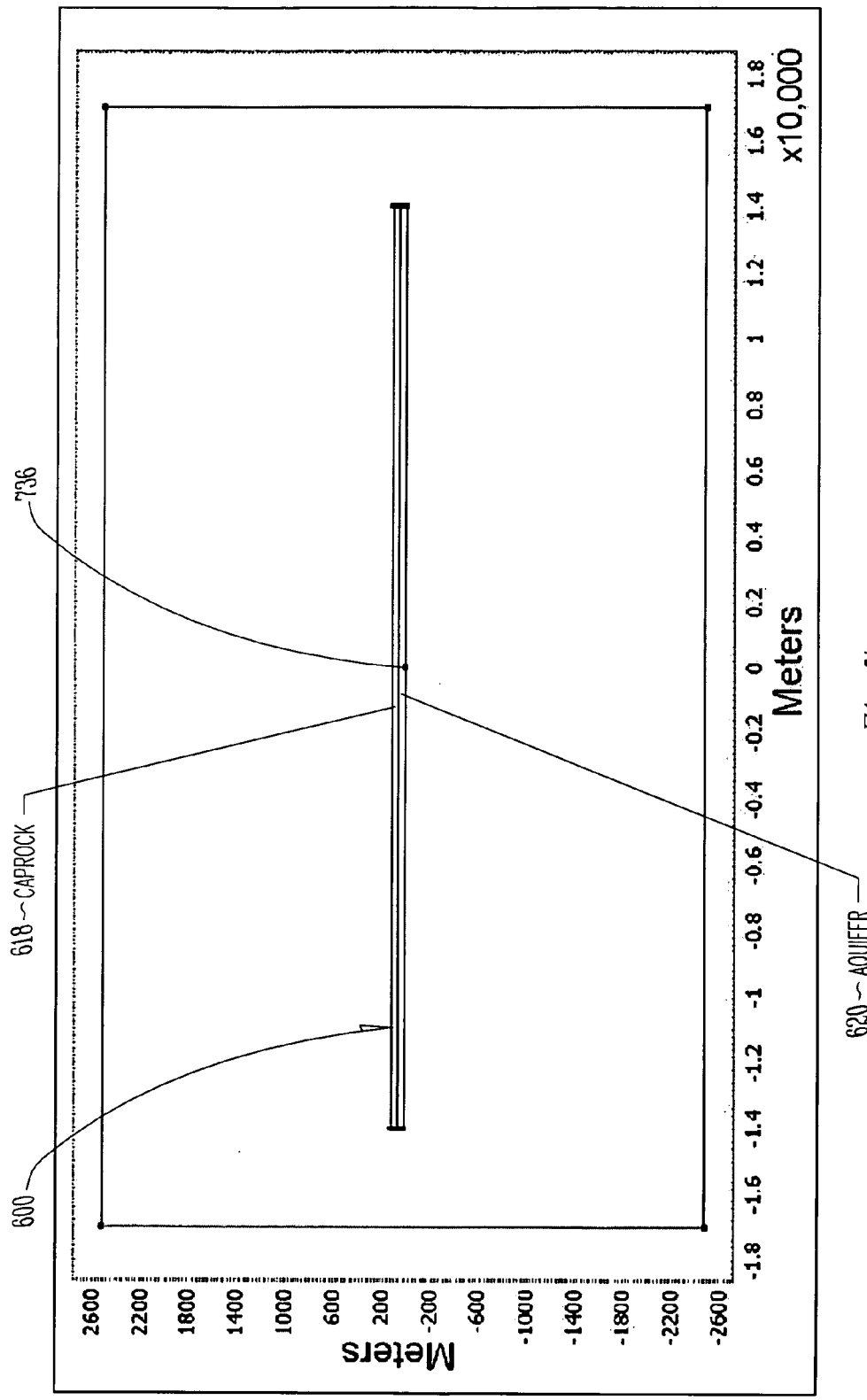
FIG. 7 is an illustration of a geological structure used for a numerical model of a power generation system according to an embodiment of the invention.

FIG. 7 is an illustration of the target formation 600, containing the caprock 618 and aquifer 620. A simulated injection well 736 can be seen within the aquifer 620. Since no deep wells exist in Minnesota to provide geometric configurations of aquifer and caprock units, the cross-section was used only to verify that the estimated rift structure was sufficiently deep for carbon dioxide storage and to estimate depths for storage units. Due to the lack of measured data, a rectangular aquifer 50 meters (m) thick (in height) and several km in length was assumed and illustrated in FIG. 7.

The model geology was expanded by placing a capping material, i.e., caprock 618 dimensionally equivalent to the aquifer 620, immediately above the aquifer 620. The aquifer and caprock are then encased in a surrounding material that extends vertically to the ground surface with the aquifer at a depth of about 2500 m, and horizontally several kilometers beyond the aquifer and caprock (See, for example, FIG. 6). The extent of surrounding material was chosen such that the upper and lower boundaries were far enough from the aquifer to realistically assume that no fluid flow occurs across the boundaries during the simulated time interval while the left and right boundaries were chosen to be sufficiently far from the modeling domain of interest to assume hydrostatic fluid pressure conditions (i.e., constant pre-injection fluid pressure conditions). The surrounding unit's permeability was valued at $10^{-19}$ m$^2$, and the pore fraction was 0.04 (i.e., 4%) based on the data provided by the MGS. Fluid flow was permitted through the top and bottom of the aquifer to simulate natural conditions.

A solute solution of one (1) % $CO_2$ was injected (the remaining content being water), with a solute weight approximately equivalent to supercritical $CO_2$ at a depth of 2500 m, in the center of the aquifer for a period of one year. The injection rate can be varied to approximate injection of all $CO_2$ produced by a large (e.g., about 250 megawatt (MW) to about 1000 MW) fossil fuel-fired power plant. Carbon dioxide as a solute in water was assumed for injection into a water aquifer because the solute approach simplified modeling as compared with pure carbon dioxide fluid. Future modeling may include use of pure carbon dioxide fluid.

Figure 8:
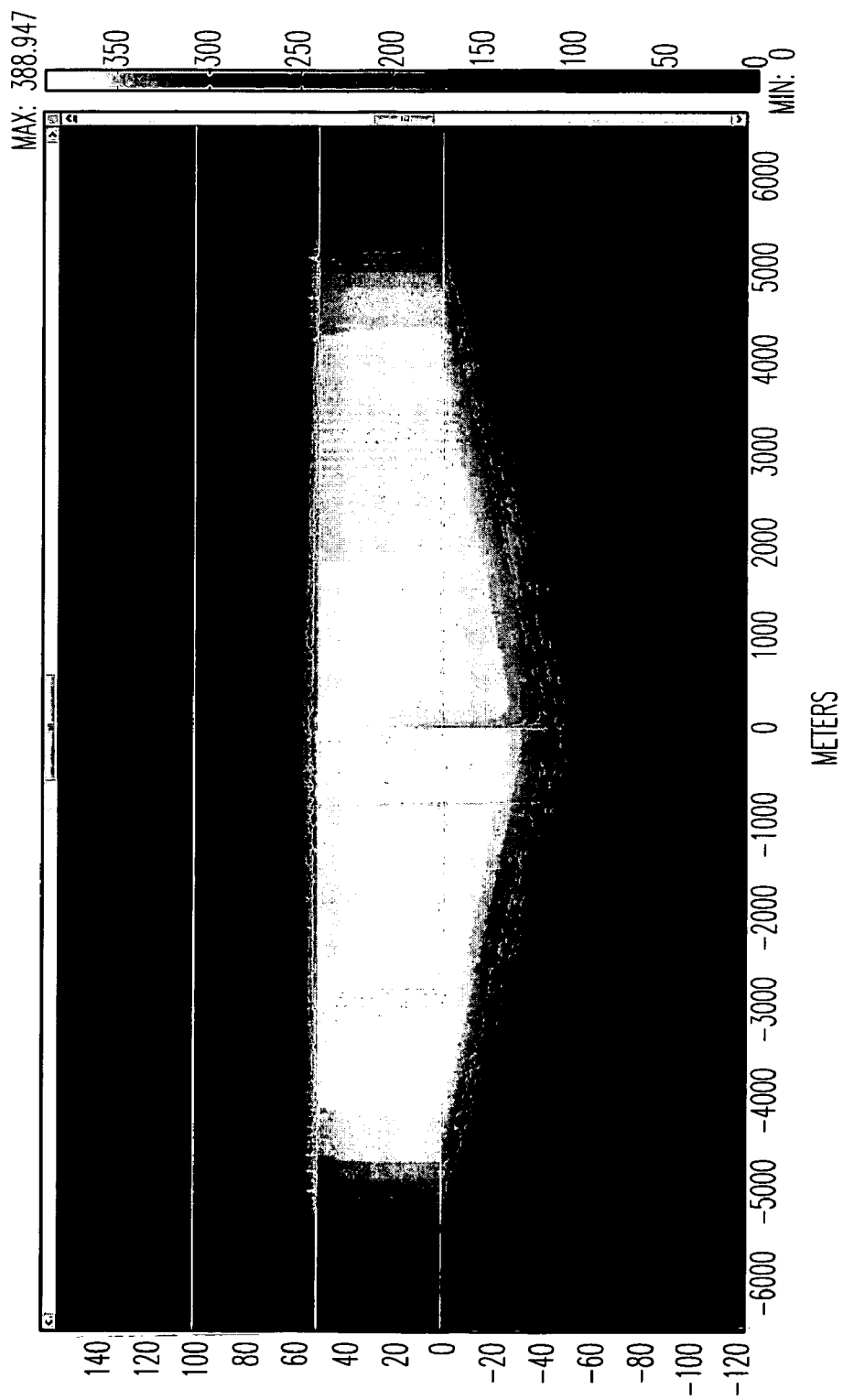
FIG. 8 is a geological model showing dimensions and solute concentration according to an embodiment of the invention.

Approximately 30 scenarios were run (see FIG. 8 for a visualization of a sample injection), with varying injection rates and aquifer and caprock permeabilities and porosities. The results are set forth below in Table 1.

TABLE 1

Injection Rates and Aquifer and Caprock Permeabilities and Porosities

|  |  | Max concentration of solute in aquifer [units of kg/m$^3$] | Distance in aquifer from injection well horizontally to liquid with a concentration of 1 kg/m$^3$ [m] | Leakage through caprock |
|---|---|---|---|---|
| Porosity of aquifer |  |  |  |  |
| Value used when other parameters are varied: | 0.1 |  |  |  |
| Range: | 0.02 | 150 | 14000 | Yes |
|  | 0.04 | 150 | 13139 | No |
|  | 0.06 | 150 | 11588 | No |
|  | 0.08 | 150 | 10214 | No |

TABLE 1-continued

Injection Rates and Aquifer and Caprock Permeabilities and Porosities

|  |  | Max concentration of solute in aquifer [units of kg/m$^3$] | Distance in aquifer from injection well horizontally to liquid with a concentration of 1 kg/m$^3$ [m] | Leakage through caprock |
|---|---|---|---|---|
|  | 0.1 | 150 | 9075 | No |
|  | 0.12 | 150 | 8150 | No |
|  | 0.14 | 150 | 7391 | No |
|  | 0.16 | 150 | 6749 | No |
|  | 0.18 | 150 | 6225 | No |
|  | 0.2 | 150 | 5761 | No |
| Permeability of aquifer |  |  |  |  |
| Value used when other parameters are varied | 10$^{-13}$ m$^2$ |  |  |  |
| Range: | 10$^{-13}$ | 150 | 9075 | No |
|  | 10$^{-14}$ | 153 | 8927 | No |
|  | 10$^{-15}$ | 186 | 7665 | Some |
|  | 10$^{-16}$ | 430 | 3656 | Some |
|  | 10$^{-17}$ | 1261 | 1167 | Yes |
|  | 10$^{-18}$ | 3472 | 360 | Yes |
|  | 10$^{-19}$ | 14080 | 170 | Yes |
|  | 10$^{-20}$ | 62970 | 123 | Yes |
| Porosity of caprock |  |  |  |  |
| Value used when other parameters are varied | 0.08 |  |  |  |
| Range: | 0.02 | 150 | 9160 | Yes |
|  | 0.04 | 150 | 9133 | Yes |
|  | 0.06 | 150 | 9101 | Some |
|  | 0.08 | 150 | 9075 | No |
|  | 0.1 | 150 | 9031 | No |
|  | 0.12 | 150 | 9024 | No |
|  | 0.14 | 150 | 8997 | No |
|  | 0.16 | 150 | 8963 | No |
| Permeability of caprock |  |  |  |  |
| Value used when other parameters are varied | 10$^{-18}$ m$^2$ |  |  |  |
| Range: | 10$^{-18}$ | 150 | 9075 | No |
|  | 10$^{-19}$ | 158 | 8904 | No |
|  | 10$^{-20}$ | 192 | 7820 | No |
|  | 10$^{-21}$ | 317 | 5684 | No |
| Pumping rate |  |  |  |  |
| Value used when other parameters are varied | 5 m$^3$/s |  |  |  |
| Range: | 5 | 150 | 9075 | No |
|  | 10 | 292 | 9101 | No |
|  | 15 | 499 | 9134 | No |
|  | 20 | 623 | 9150 | Some |

The model indicated that the matrix permeability of the caprock in the rift was sufficiently low, ranging between 10$^{-21}$ m$^2$ to 10$^{-18}$ m$^2$. This was sufficient to serve as an effective reservoir caprock in the absence of large-scale hydrofracturing. Furthermore, deep geological sequestration and carbon plume geothermal (CPG) system would be possible in the reservoir of the rift, provided that large sandstone bodies with porosities in the range of 0.04 to 0.2 (i.e., about four (4) % to 20%) and permeabilities in the range of 10$^{-15}$ m$^2$ to 10$^{-13}$ m$^2$ (with an uncertainty of about a factor of 10) would eventually be located in the rift at depths greater than 800 m below a caprock with the above properties.

The model also indicated that the horizontal spread of solute was generally less than about ten (10) km from the injection point, which is a relatively small distance, and the result was interpreted to indicate reasonable storage space for aquifers having the previously defined properties. The results also suggest that in a CPG scenario, carbon dioxide would travel from injection to production wells, which could be a few hundred meters to several kilometers apart, within a relatively short period of time (typically less than a year to a maximum of approximately three (3) years).

Additional modeling demonstrated that the porosity of caprock units can be in a range from between about 0.06 to about 0.16 (i.e., about six (6) % to about 16%, respectively). Note that this range overlaps with that of the aquifer porosity. The models also indicated that porosity overlap would not be problematic for carbon dioxide storage, provided caprock permeability is several orders of magnitude lower than aquifer permeability. This preliminary study further provides support for providing a single injection well to accommodate all the carbon dioxide produced by an approximately 1000 MW coal-fired power plant using the novel systems described herein.

These results provide support for using a reservoir having a porosity of at least about (4) % and a permeability of at least about 10$^{-15}$ m$^2$ or greater for sequestration within the MRS assuming presence of a caprock having a maximum permeability of about 10$^{-18}$ m$^2$, although permeabilities as low as 10$^{-16}$ m$^2$ may be used in certain instances. These results are consistent with ranges defined by the MGS using a compilation of current carbon dioxide storage studies worldwide and are also within the ranges that might be found in the MRS.

Example 2

In this example, a model of various $CO_2$-based geothermal systems in a naturally porous, permeable aquifer, i.e., the novel $CO_2$ Plume Geothermal (CPG) system is compared to a conventional $CO_2$-based engineered EGS and a conventional water-based (i.e., non-EGS) geothermal system.

Figure 9:
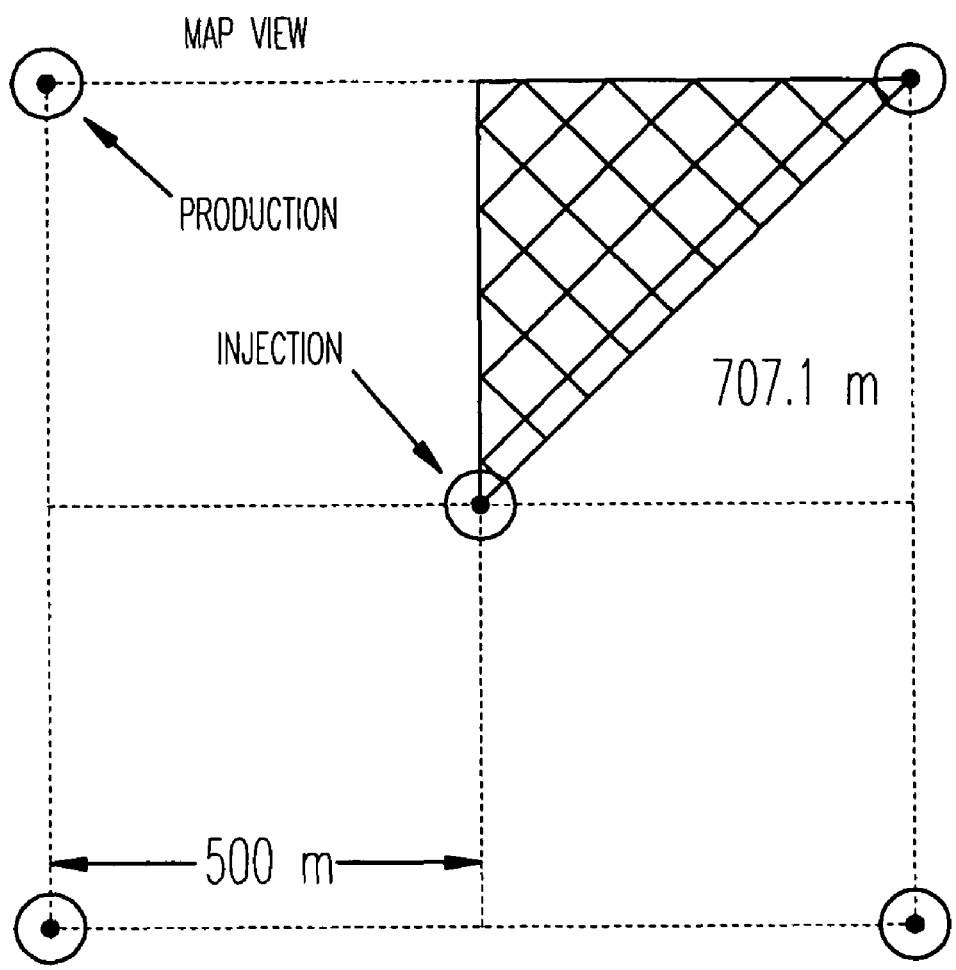
FIG. 9 is an illustration of an exemplary geometrical configuration according to an embodiment of the invention.

For all sample models, the geometry as shown in map view in FIG. 9 is utilized. The system is (horizontally) one kilometer square and 305 m thick with one injection well at the center and four production wells, one at each corner of the square, as shown in FIG. 9. By symmetry, only $1/8^{th}$ of the system need be modeled, as shown in the gridded area of FIG. 9. This geometry is typical of early-stage geothermal system models and approximates real-world, water-based geothermal installations. The model thus provides a direct comparison to water-based geothermal power generation systems as well as $CO_2$-based EGS systems.

Parameters for Sample Models

Unless otherwise noted, the following parameters are used in the models of CPG formations that provide the results shown in the figures.

Table 2 shows details of the modeled geothermal reservoir.

TABLE 2

Geothermal Reservoir Specifics

| Geothermal reservoir | |
|---|---|
| Thickness | 305 meters |
| Distance between injection and production wells | 707.1 meters |
| Permeability | $10^{-14}$ m$^2$ |
| Porosity | 20% (i.e., 0.20) |
| Rock grain density | 2600 kg/m$^3$ |
| Rock specific heat | 1000 J/kg/° C. |
| Rock thermal conductivity | 2.51 W/m/° C. |
| System initial and boundary conditions | |
| Reservoir fluid | All $CO_2$ or all water |
| Temperature | 100° C. |
| Pressure | 250 bar |
| Top and side boundaries | No fluid or heat flow |
| Bottom boundary | No fluid flow, heat conduction |
| Injection and production conditions | |
| Reservoir area | 1 km$^2$ |
| Temperature of injected fluid | 20° C. |
| Injection/production rate | 300 kg/s |
| Down hole injection pressure | 250 bar |
| Down hole production pressure | 240 bar |
| Injection/production duration | 30 years |

CPG System Compared to $CO_2$-Based EGS System.

Figure 10:
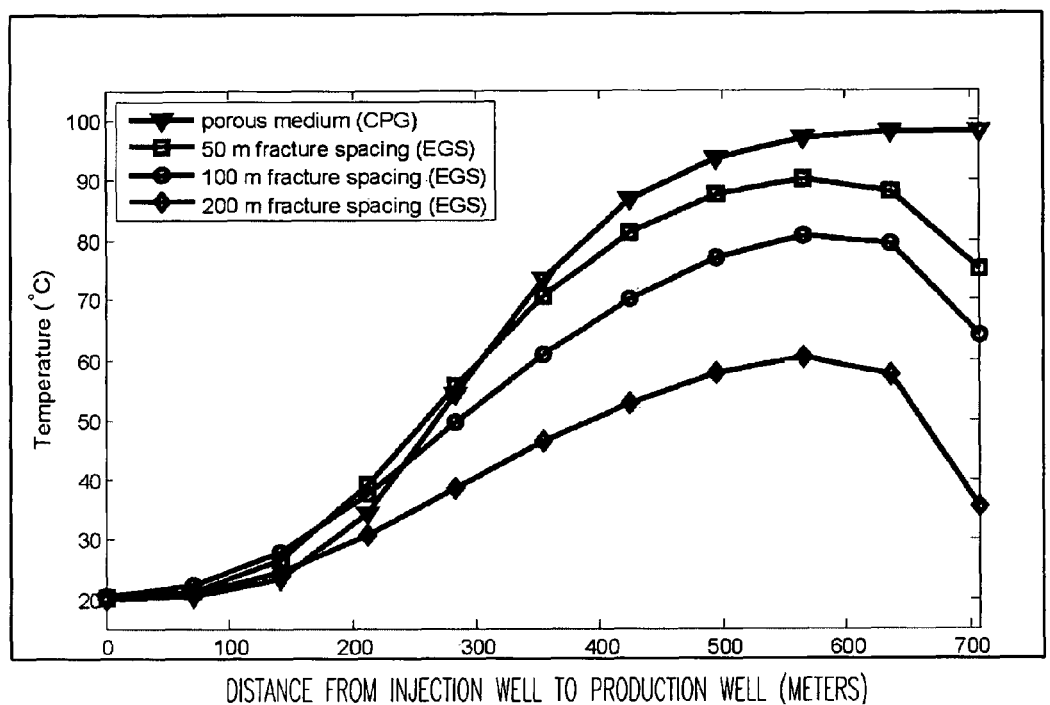
FIG. 10 is a graph showing temperature versus distance from an injection well to a production well for a porous medium in a carbon dioxide ($CO_2$) plume geothermal (CPG) system and various fracture spacings in an enhanced geothermal system (EGS) system according to an embodiment of the invention.

FIG. 10 is a graph showing temperature versus distance from the injection well to a production well for various fracture spacings in the EGS cases (the CPG system does not contain specific fractures but rather a granular porous medium). Specifically, FIG. 10 compares the novel CPG system (top line) with several conventional $CO_2$-based EGS systems using various average fracture spacings (200 m, 100 m and 50 m, from bottom to second from the top), thus providing a cross section through the model geometry from injection well to production well. As such, FIG. 10 displays a temperature "snapshot" after 10 years of injection and production in this very low temperature geothermal environment. (The low temperature scenario was simulated to illustrate performance at commonly unfavorable low-temperature conditions. System performance increases for higher temperatures).

Surprisingly, there are substantial differences between the CPG and EGS models. With respect to the CPG case, near pre-production temperatures (and in general higher temperatures) were maintained at the production well for much longer than in the EGS models. These results indicated there was a more thorough thermal energy recovery in CPG systems as compared to the conventional EGS models. Hence, it is expected that, in use, a CPG system will achieve higher efficiency and maintain economic viability longer (due to longer-term production of high-temperature fluids) than a conventional EGS.

Additionally, after ten (10) years of injection and production, the maximum temperature in the reservoir in the CPG system occurred at the production well, which was not the case for the EGS system. As electrical energy production efficiency (and viability of system implementation) is directly related to fluid temperature, the CPG systems provided higher efficiency than EGS.

Finally, as the EGS cases revealed, the wider the average fracture spacing, the lower the temperature of produced fluid with time. Thus, all else being equal, CPG systems can be implemented in lower temperature formations (therefore, in more areas worldwide) than (even $CO_2$-based) EGS (let alone water-based EGS). The substantial differences in produced fluid temperatures between CPG systems and $CO_2$-based EGS were surprising and unexpected.

Figure 11:
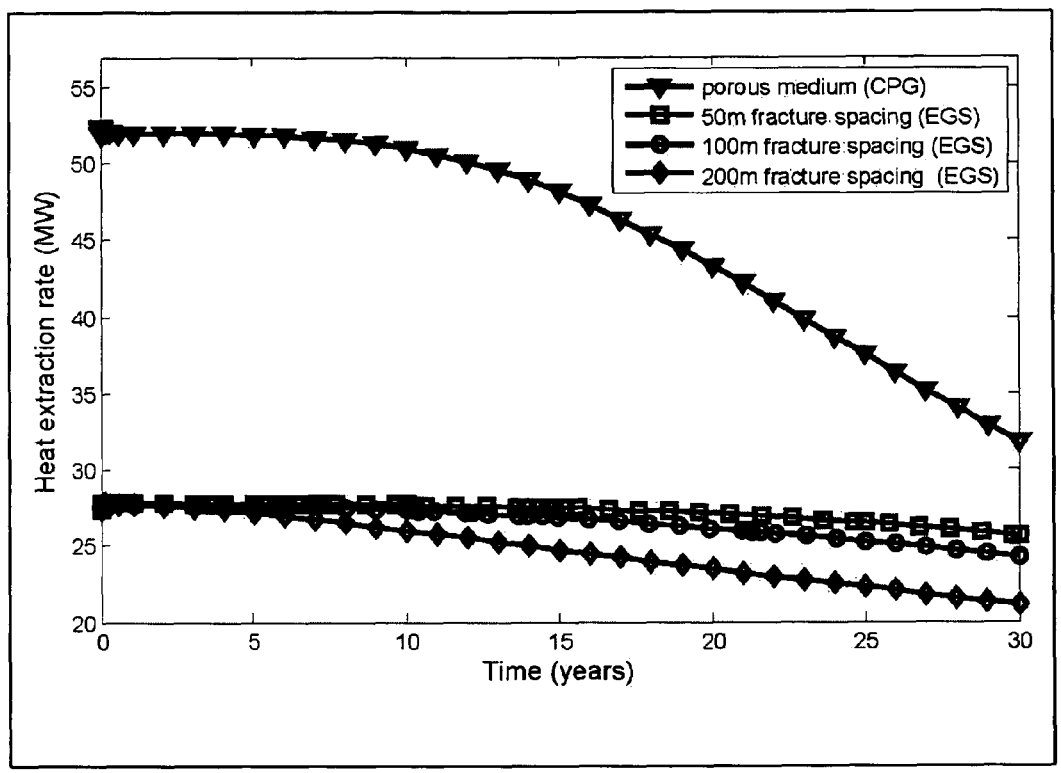
FIG. 11 is a graph showing heat extraction rate versus time for a porous medium in a CPG system and various fracture spacings in an EGS system according to an embodiment of the invention.

FIG. 11 shows a CPG system in comparison with several $CO_2$-based EGS examples, showing heat energy production as a function of time. In these examples, for a given pressure differential between injection and production wells, the CPG system produced over 1.75 times more heat energy than a comparable $CO_2$-based EGS. To produce comparable amounts of heat energy, EGS required a much higher (more than factor of two) pressure difference between the injection well and the production well. Thus, the EGS had a much greater pumping energy requirement and lower power production efficiency than the CPG systems.

CPG System Compared to Water-Based Non-EGS Geothermal System

Figure 12:
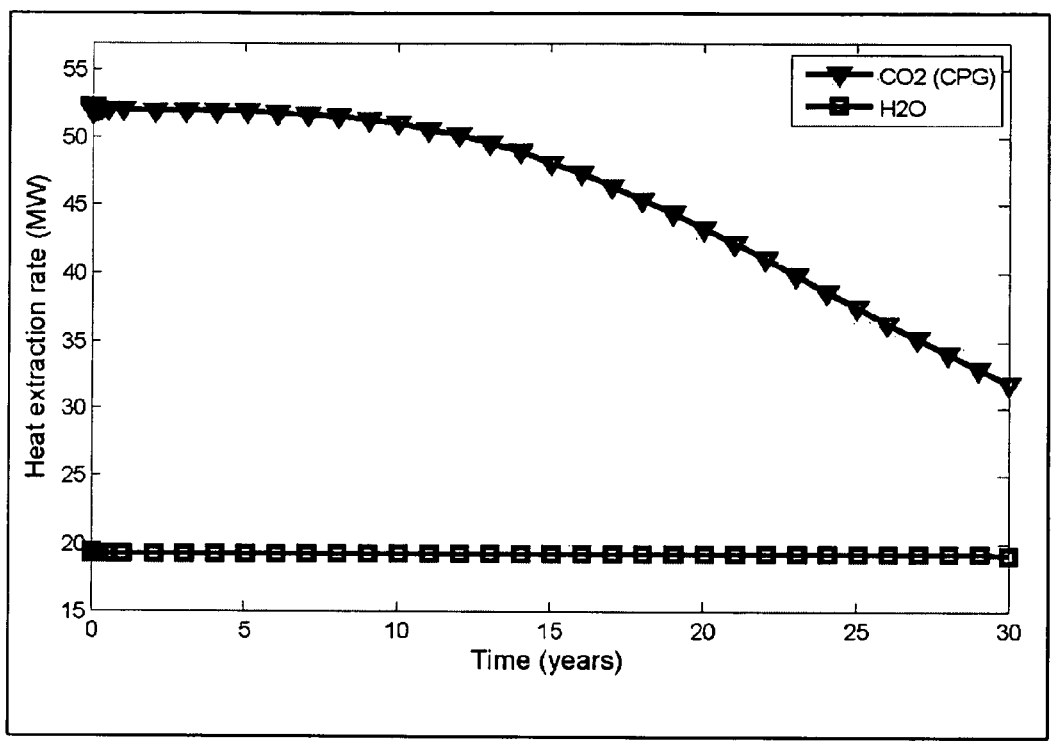
FIG. 12 is a graph showing heat extraction rate versus time for a CPG system as compared to a water system according to an embodiment of the invention.

FIG. 12 compares thermal energy extraction rates between a CPG system and a water-based regular (i.e., non-EGS, meaning a reservoir/non-hydro fractured) geothermal system, everything else being equal. Surprisingly, thermal energy extraction rates are 1.7 to 2.7 times larger with $CO_2$ than water, which appears to be primarily a result of $CO_2$ mass flow rates being up to 5 times greater than those of water, given a fixed pressure difference between injection and production wells. Interestingly, based on conventional wisdom, it was expected that $CO_2$ energy extraction rates would be up to 1.5 times larger than those of water. See, for example, Pruess, "*Enhanced geothermal systems (EGS) using $CO_2$ as working fluid—a novel approach for generating renewable energy with simultaneous sequestration of carbon,*" Geothermics 35 (4), pp. 351-367, 2006. Therefore, the above result is surprising in that conventional practices predict different results, thus teaching away from such a system. Additionally, these results show the widespread potential for CPG implementation in areas previously inaccessible to geothermal energy extraction by traditional, water-based means.

$CO_2$ mass flow rates can be largely attributed to high $CO_2$ mobility (density to dynamic viscosity ratio, $\rho/\mu$). To note, real-world geothermal installations typically operate on a fixed differential production pressure, as has been included in the above models.

Figure 13:
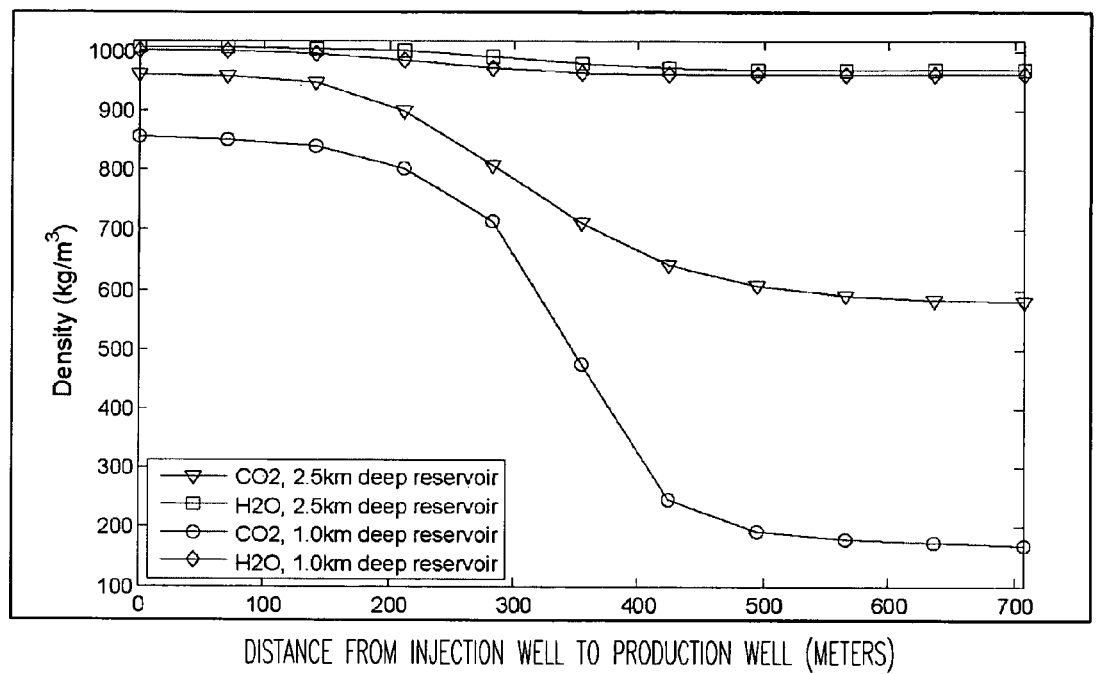
FIG. 13 is a graph showing density versus distance from injection well to production well for a CPG system as compared to a water system according to embodiments of the invention.

FIG. 13 provides density profiles from injection well to production well, comparing $CO_2$ and $H_2O$ cases for two different reservoir depths. These plots are applicable to both naturally porous, permeable (CPG) systems and to EGS. Use of $CO_2$-based systems (lower two lines indicating different reservoir depths) compared to water-based systems (upper two curves indicating different reservoir depths) allows for a large density change in $CO_2$ between injection and production points. A drop in density from injection to production wells drives fluid flow through the subsurface system, an effect known as a thermosyphon, which reduces pumping requirements, a substantial energy draw in geothermal systems. Hence, the $CO_2$ system has much lower pumping energy requirements than a comparable water-based system.

Figure 14:
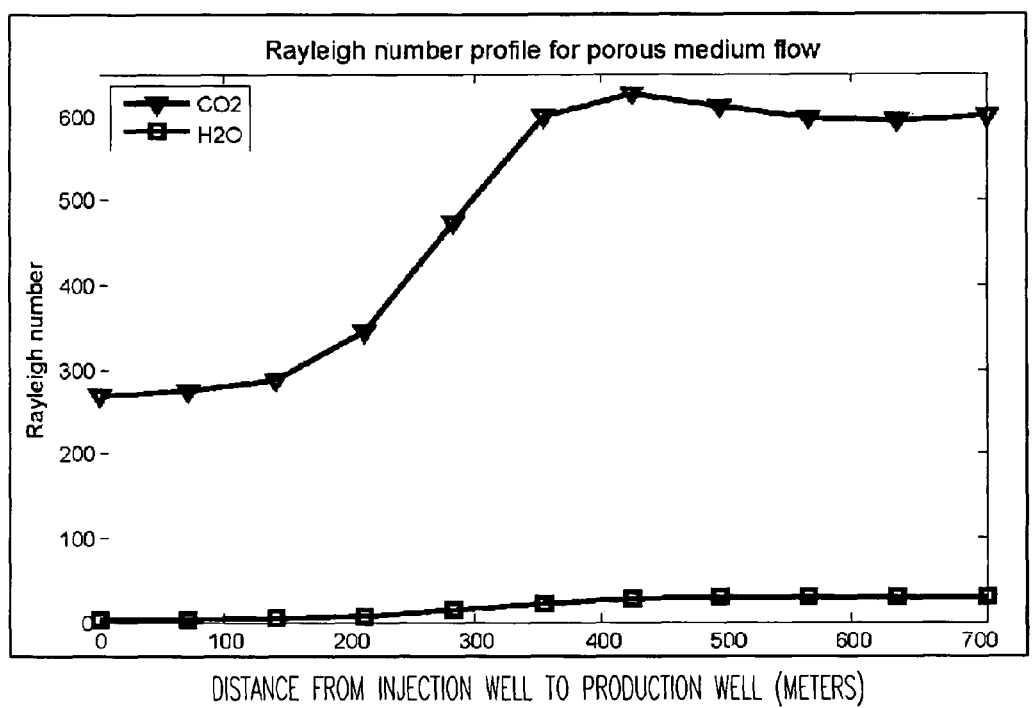
FIG. 14 is a graph showing Rayleigh number versus distance from injection well to production well for a CPG system as compared to a water system according to an embodiment of the invention.

As a result of these findings, scenarios may be envisioned where a CPG system does not even require a pump. Additionally, and surprisingly, the two $CO_2$ curves in FIG. 14 reveal that the injection to production density difference is much larger for $CO_2$ at shallower depths, while the water curves reveal little change with depth. This result applies to both EGS and CPG systems. Therefore, as EGS (with $CO_2$ or water) typically target much deeper reservoirs than are proposed for CPG systems, CPG demonstrates increased thermosyphon properties as compared with EGS.

Dimensionless numbers can be utilized to further describe the properties of $CO_2$ as compared to water in naturally porous, permeable (i.e., non-EGS) geothermal systems. For example, the above plot reveals that the $CO_2$ Rayleigh number is much higher than that of water, indicating $CO_2$ more readily advects/convects (circulates due to heat energy recovery) through the reservoir than water (all else being equal).

Figure 15:
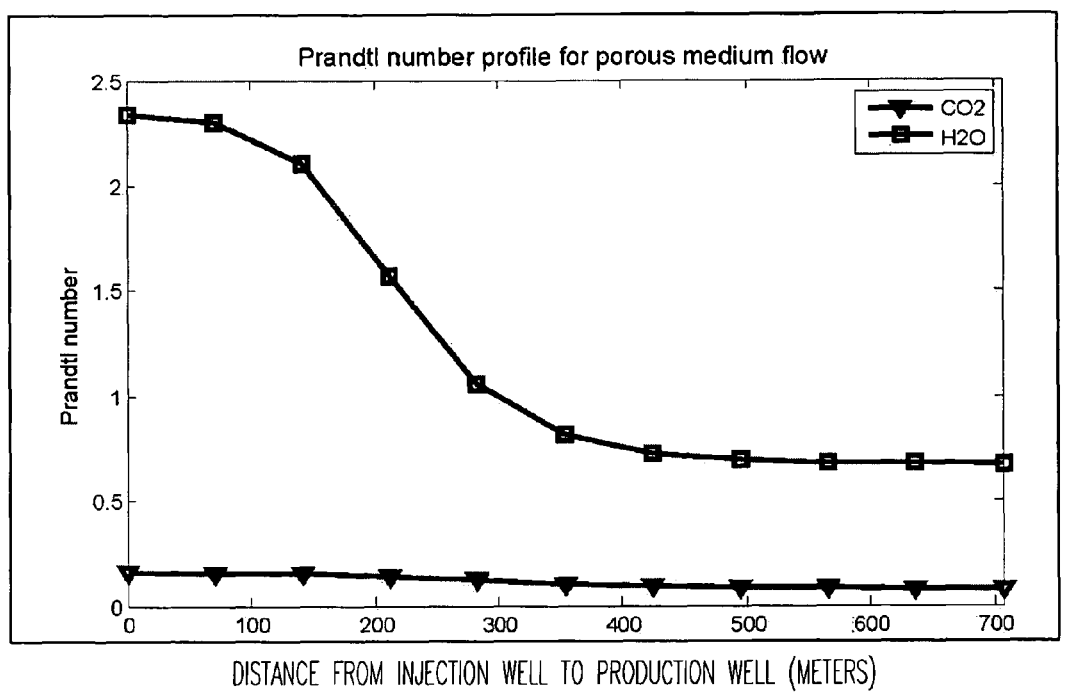
FIG. 15 is a graph showing Prandtl number versus distance from injection well to production well for a CPG system as compared to a water system according to an embodiment of the invention.

As the water Prandtl dimensionless number indicates in FIG. 15, as compared to the Prandtl number for $CO_2$, water more readily diffuses momentum than heat. Hence, $CO_2$ more easily moves through a geothermal reservoir than water, and the increased mobility of $CO_2$ (see also statement about mobility of $CO_2$ above) ultimately leads to the improved heat energy recovery of $CO_2$-based compared to water-based systems.

Surprisingly, the CPG system is able to increase power production efficiency by utilizing $CO_2$'s low freezing point. Since $CO_2$ does not freeze at 0° C., unlike water, a $CO_2$ power cycle can use sub 0° C. condensing temperatures in its power system, increasing power production efficiency on top of efficiency improvements acquired in the geothermal reservoir.

Exemplary Reservoir Parameter Ranges

As a result of the above modeling, various exemplary reservoir parameters were determined as useful in the embodiments described herein. Of course, other parameters are also possible, which can be determined with additional modeling, proto-type testing and full-scale testing, including the testing described below in Prophetic Example 3.

TABLE 3

Exemplary Reservoir Parameters

| | |
|---|---|
| Permeability | $0.5 \times 10^{-15}$-$1 \times 10^{-11}$ m$^2$ |
| Porosity | 0.05-0.4 |
| Depth below surface | 800-5000 m |
| Temperature | 70-300° C. |

Example 3

Prophetic

Modeling of $CO_2$ Reservoir Formation

Modeling of the formation of a $CO_2$ plume in a geologic structure will be performed. It is expected that numerical models of $CO_2$ injection into a brine or hydrocarbon filled geologic formation will show that a large (on the order of a kilometer in area and several tens to hundreds of meters thick), near-pure $CO_2$ plume can be established via displacement of the native fluid. The time period from onset of injection to CO2 recovery at production wells is expected to be on the order of several months to two years (maximum 3 years), depending on site characteristics.

It is expected that initial plume formation will require a sequence of injection rates and durations designed to ensure thorough displacement of the native reservoir fluid and avoidance of so-called fingering or short-circuiting effects. It is expected that about 50% to about 95%, such as about 65% to 75%, such as approximately 70% of the injected $CO_2$ will be recoverable at production wells and cycled through the surface power system. The remaining fraction of injected $CO_2$ will be permanently geologically sequestered, as this term is understood in the art.

Reactive Transport and Poroelastic Modeling

In addition to physical experiments, modeling of the chemical reactions among injected $CO_2$, native reservoir brine or hydrocarbons, and reservoir rock is useful for understanding the function and the ranges of viable parameters for CPG systems. Similarly, modeling of the physical responses of a natural aquifer, including pore and matrix deformation and pressure propagation will be performed.

One geochemical consequence of $CO_2$ injection into a naturally porous, permeable geologic formation overlain by a caprock (likely shale) that we expect to see from our modeling is fluid heating from exothermic reactions. Unique to some CPG systems, and something that is not possible in water-based geothermal systems and likely not possible in EGS (even $CO_2$-based EGS which would typically not include a caprock), are $CO_2$ reactions with some caprock minerals that produce heat. Because comparable water reactions are rare in geologic reservoir environments and EGS likely will not encounter native rocks that allow such reactions, CPG systems are uniquely able to make use of such geochemical behavior to enhance heat energy recovery. $CO_2$ injected into a geologic formation will naturally rise to the top of the formation, where it will rest against/underneath the local caprock. Should exothermic reactions occur, they would impart heat to the $CO_2$, which could be recovered to produce electricity as the fluid cycles through the CPG system. At the same time, these $CO_2$-mineral reactions can be volume-increasing thereby serving to (further) seal the caprock. Such reactions may not occur in the reservoir itself if the reservoir rocks/minerals/sediments are of a different composition than the caprock materials.

Coupled Reservoir-Wellbore Modeling

Modeling fluid flow from the geologic reservoir through the wellbores is useful for the calculation of pumping requirements and permits estimation of fluid heating or cooling in the wells. It is expected that, because of the (greater) depths and temperatures typically targeted for EGS compared to those used for CPG systems, CPG systems will result in less $CO_2$ cooling than $CO_2$-based EGS as the heated fluid moves from the reservoir to the surface, showing further energy recovery improvements of CPG as compared to EGS.

Layered Reservoirs

Future models will account for fluid movement through the vertical dimension of a geologic formation, whereas models to date assume primarily lateral flow. It is expected that accounting for the third dimension (i.e., vertical dimension) will reveal additional features, such as improved heat recovery in CPG systems, as compared with $CO_2$-based EGS (and water-based EGS and non-EGS systems) because in the CPG system, the heat transfer fluid will encounter considerably more heated rock.

Geochemical Reaction Experiments

Other experiments will examine geochemical reactions among $CO_2$, brine or hydrocarbons, and rock under temperature, pressure, and composition conditions that would be encountered in CPG systems or $CO_2$-based EGS. It is expected that the sedimentary rock reservoirs that would very often be used for CPG systems (because of depth, porosity, permeability, and existence of traps (reservoir with overlaying caprock that may also include a low permeability feature such as fault in some instances)), among other reasons, will show lower reactivity than the reservoirs typically accessible for EGS (because of the greater depths targeted for EGS). As such, EGS reservoirs are expected to be more easily clogged by mineral precipitation or short-circuited due to mineral/rock/sediment dissolution reactions which both can render such systems unusable.

CONCLUSION

The carbon dioxide-based energy generating system described herein provides a novel means for producing renewable energy, while further providing for carbon dioxide sequestration, thus providing a process with a negative carbon footprint. In one embodiment the geothermal power plant has a negative carbon dioxide output, thus providing the first electricity-generating power scheme with a negative carbon footprint. Carbon dioxide sequestration also provides added revenue to a power plant under a carbon-trading market. In contrast to conventional EGS (conventional water-based EGS and conventional CO2-based EGS) sites which utilize large-scale hydrofracturing of rocks to create a usable reservoir, the embodiments described herein rely on natural or previously created reservoirs (including previously fractured natural gas formations) in combination with only minor disturbances at most, such that the target formation remains in situ, thus minimizing the negative effects of large-scale hydrofracturing described herein and known in the art. In one embodiment, a global warming reduction system is provided.

In embodiments which utilize supercritical carbon dioxide, the excellent thermodynamic, fluid dynamic, and chemical properties of this working fluid provide new ways of generating electric power in regions formerly unimaginable for this purpose, such as the eastern and mid-western parts of North American may now be considered for renewable, clean, geothermal electricity production. This approach further enhances the efficiency of geothermal power plants, particularly during colder months, as compared to traditional water-based systems, thereby potentially allowing electricity production in such low heat flow regions, such as, for example, Minnesota, and other climatologically and geologically similar locations in a sustainable and highly efficient manner. Such plants are also expected to be more compact than water-based versions, thereby reducing the plant's spatial and environmental footprint.

Compared to water, carbon dioxide can be cooled well below zero (0)° C. (above atmospheric pressure), such as about −55° C., without freezing. Carbon dioxide additionally allows the whole system to be run under pressures higher than ambient pressures. In contrast, water systems apply partial vacuums in parts of the cycle, which are prone to leaks. Additionally, the increased pressure allows for higher fluid densities, as compared to water, and thus smaller piping and other components reducing capital investment costs.

In one embodiment, the system is a closed loop carbon dioxide system without a carbon dioxide sequestration component. In other embodiments, the ability to contain carbon dioxide with use of an open loop or partially open loop system further enhances the efficiency of the system and provides a means to sequester carbon dioxide from, for example, a conventional power plant. In fact, by not recovering all of the carbon dioxide, some or most of the carbon dioxide (e.g., from about five (5) % to about 95%, can be sequestered. Additionally, these same systems and methods can also be applied to providing geothermal energy to heat pumps for space heating or for direct use, as described herein. In contrast to wind and solar power systems, geothermal systems are highly scalable and can provide base-load and dispatchable (peak) power as desired. Similarly, on a human-time scale, geothermal energy is a renewable energy resource and it is cheaper than coal, wind, nuclear, etc. and comparable in cost to natural gas.

The carbon dioxide-based geothermal energy generating system can be used to produce energy for a number of uses, including for commercial sale, process load (to operate the geothermal power or CO2 sequestration system) and electricity generation. In the exemplary embodiments described in detail herein, the system is designed to generate energy in quantities sufficient to provide electricity, to provide heat for on- or off-site uses, to provide shaft power to operate the on-site equipment, or combinations thereof, and the like. In this way, the use of fossil fuels, such as natural gas, is limited, while operational costs are reduced.

Embodiments of the novel system and methods described herein provide, for the first time, the ability to provide electricity from a geothermal source at temperatures much lower than are required for conventional water-based geothermal systems, although higher operating temperatures may optionally be used.

Embodiments of the novel systems and methods described herein are efficient, economical and relatively simple in operation. In one embodiment, the process uses a production waste product ($CO_2$) that must otherwise be properly disposed of, sometimes at significant costs. Various embodiments also allow an operating liability to be turned into a business asset, while simultaneously providing environmental benefits.

Embodiments of the invention can be employed as part of a simplified cost-effective geothermal energy system using natural state rock formations as subterranean in situ rock reservoirs. Various embodiments can also be used for subterranean carbon sequestration and permanent storage of $CO_2$. The use of saline aquifers and saline water-filled rock formations in one embodiment further allows water to be utilized which is unlikely to be used for consumption or irrigation. Embodiments may further be part of an enhanced oil recovery (EOR) scheme and other hydrocarbon extraction methods, thereby enhancing hydrocarbon recovery (in addition to providing geothermal energy and to providing a means to sequester $CO_2$).

In one embodiment, the source of the carbon dioxide and carbon dioxide-based geothermal energy generating system are located on the same site or less than about one (1) km of each other, although the invention is not so limited. In one embodiment, the energy generation system is in close proximity to the carbon-dioxide producing source, such that energy which is generated with the system described herein is consumed partially or completely as power to the facility itself, thus eliminating the need for an elaborate and expensive piping system. In other embodiments, the energy produced with the energy generating system is piped any desired distance to be utilized in any desired manner. In yet other embodiments, some or all of the energy is used to power other types of manufacturing facilities and/or is sold to a local utility, and/or is used to generate electricity on-site.

Although specific embodiments have been illustrated and described herein, it will be appreciated by those of ordinary skill in the art that any arrangement that is calculated to achieve the same purpose may be substituted for the specific embodiments shown. For example, although the embodiments have been described with carbon dioxide as the working fluid, in other embodiments, fluids other than carbon dioxide, having the properties, may be used. Additionally, a working fluid may be injected as part of an enhanced oil recovery (EOR) or enhanced natural gas or other hydrocarbon recovery scheme. This application is intended to cover any adaptations or variations of the invention. It is intended that this invention be limited only by the following claims, and the full scope of equivalents thereof.

What is claimed is:

1. A system comprising:
one or more injection wells for accessing one or more reservoirs having a first temperature, wherein the one or more reservoirs are located below one or more caprocks, each caprock having a permeability ranging from about $10^{-16}$ m$^2$ to about zero (0) m$^2$, wherein the one or more reservoirs are accessible without using large-scale hydrofracturing, each of the one or more injection wells having an injection well reservoir opening;
one or more production wells, each having a production well reservoir opening, wherein a non-water based working fluid provided to the one or more injection wells at a second temperature lower than the first temperature and exposure of the non-water based working fluid to the first temperature produces heated non-water based working fluid capable of entering each of the one or more production well reservoir openings; and
an energy converting apparatus connected to each of the one or more injection wells and the one or more productions wells, wherein thermal energy contained in the heated non-water based working fluid is converted to electricity, heat, or combinations thereof, in the energy converting apparatus.

2. The system of claim 1, wherein each of the one or more injection wells and each of the one or more production wells are located in a common channel and the system further comprises one or more injection pipes and one or more production pipes connected to the common channel.

3. The system of claim 1, comprising a non-water based working fluid source.

4. The system of claim 1, wherein the non-water based working fluid source is carbon dioxide obtainable from a power plant or an industrial plant.

5. The system of claim 4, wherein the power plant is an ethanol plant or a fossil-fuel based plant and the system further comprises the power plant or the industrial plant.

6. The system of claim 1, wherein the carbon dioxide is supercritical carbon dioxide, further wherein the energy converting apparatus comprises at least one of: one or more expansion; one or more generators; or one or more heat exchangers.

7. The system of claim 6, wherein the one or more expansion devices and the one or more generators provide electricity to an electricity provider.

8. The system of claim 6, wherein each of the one or more heat exchangers provide heat to a heat provider.

9. The system of claim 8, wherein the heat provider is a direct use provider or a ground heat pump.

10. The system of claim 1, further comprising one or more cooling units fluidly connected to the one or more production wells and the one or more injection wells.

11. A method comprising:
without using large-scale hydrofracturing, accessing one or more underground reservoirs having a natural temperature, the one or more reservoirs located beneath one or more caprocks, each caprock having a permeability ranging from about $10^{-16}$ m$^2$ to about zero (0) m$^2$,
introducing a non-water based working fluid into the one or more reservoirs;
exposing the non-water based fluid to the natural temperature to produce heated fluid; and
extracting thermal energy from the fluid.

12. The method of claim 11, wherein the non-water based working fluid is carbon dioxide.

13. The method of claim 12, wherein the carbon dioxide is supercritical carbon dioxide.

14. The method of claim 11, wherein the heated fluid also contains native fluid present in the one or more reservoirs.

15. The method of claim 11, wherein the one or more reservoirs each have a porosity ranging from about one (1) % to about 50% and a permeability ranging from about $10^{-16}$ m$^2$ to about $10^{-6}$ m$^2$.

16. The method of claim 11, wherein the natural temperature is between about −30° C. and about 300° C.

17. The method of claim 11, wherein the thermal energy is used for at least one of: producing electricity; heating a working fluid in one or more heat exchangers; providing condensed fluid to the one or more reservoirs; providing cooled fluid to the one or more reservoirs; or providing shaft power to one or more pumps or compressors.

18. The method of claim 17, wherein the electricity is produced either by providing the hot fluid to one or more expansion devices or by providing the working fluid heated in the one or more heat exchangers to the one or more expansion devices, wherein the one or more expansion devices produces shaft power to one or more generators, which, in turn, produce the electricity.

19. The method of claim 17, wherein the working fluid heated in the one or more heat exchangers provides heat for at least one of: direct use; for groundwater heat pumps; or for a Rankine power cycle.

20. The method of claim 11, further comprising:
choosing the underground reservoir;
transporting a non-water based working fluid source to an area proximate to the injection well;
converting the non-water based working fluid source into the non-water based working fluid; and
providing the heat energy to a customer.

* * * * *